United States Patent
Toba et al.

(10) Patent No.: US 12,153,856 B2
(45) Date of Patent: Nov. 26, 2024

(54) TRANSMISSION APPARATUS, TRANSMISSION METHOD, RECEPTION APPARATUS, AND RECEPTION METHOD FOR DESIGNATING TACTILE PRESENTATION POSITIONS

(71) Applicant: SONY GROUP CORPORATION, Tokyo (JP)

(72) Inventors: Kazuaki Toba, Kanagawa (JP); Gen Ichimura, Tokyo (JP); Ikuo Yamano, Tokyo (JP); Osamu Ito, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 222 days.

(21) Appl. No.: 17/782,483

(22) PCT Filed: Dec. 10, 2020

(86) PCT No.: PCT/JP2020/046175
§ 371 (c)(1),
(2) Date: Jun. 3, 2022

(87) PCT Pub. No.: WO2021/131767
PCT Pub. Date: Jul. 1, 2021

(65) Prior Publication Data
US 2023/0004340 A1 Jan. 5, 2023

(30) Foreign Application Priority Data
Dec. 25, 2019 (JP) .................................. 2019-235306

(51) Int. Cl.
*G06F 3/16* (2006.01)
*G08C 15/06* (2006.01)
(Continued)

(52) U.S. Cl.
CPC .............. *G06F 3/165* (2013.01); *G08C 15/06* (2013.01); *H04J 3/1676* (2013.01); *H04R 1/26* (2013.01); *H04R 2400/03* (2013.01)

(58) Field of Classification Search
CPC ........ G06F 3/165; G08C 15/06; H04J 3/1676; H04R 1/26; H04R 2400/00
See application file for complete search history.

(56) References Cited

U.S. PATENT DOCUMENTS

2019/0235640 A1* 8/2019 Chin ....................... A63F 13/79

FOREIGN PATENT DOCUMENTS

| JP | 2014-182816 A | 9/2014 |
| JP | 2015-231098 A | 12/2015 |

(Continued)

*Primary Examiner* — Joseph Saunders, Jr.
(74) *Attorney, Agent, or Firm* — Paratus Law Group, PLLC

(57) ABSTRACT

There is provided a transmission signal to enable tactile presentation at more positions than the number of channels of a tactile vibration signal that can be transmitted. The transmission signal includes audio signals of a predetermined number of channels and tactile presentation signals of a predetermined number of channels and to which metadata designating the tactile presentation position targeted by each of the tactile presentation signals of the predetermined number of channels is added is generated. The transmission signal is transmitted to a reception side via a predetermined transmission path. For example, the metadata is dynamically changed to dynamically change the tactile presentation position targeted by each of the tactile presentation signals of the predetermined number of channels.

19 Claims, 34 Drawing Sheets

(a)

(b)

(c)

(51) Int. Cl.
*H04J 3/16* (2006.01)
*H04R 1/26* (2006.01)

(56) References Cited

FOREIGN PATENT DOCUMENTS

| | | |
|---|---|---|
| JP | 2018-060313 A | 4/2018 |
| JP | 2018-064264 A | 4/2018 |

* cited by examiner

FIG. 2

| | Full | Part-1 | Part-2 | Part-3 |
|---|---|---|---|---|
| (0)Head front | ○ | ○ | | |
| (1)Head back | ○ | ○ | | |
| (2)Head left | ○ | ○ | | |
| (3)Head right | ○ | ○ | | |
| (4)Shoulder left | ○ | ○ | | |
| (5)Shoulder right | ○ | ○ | | |
| (6)Hand left | ○ | ○ | ○ | |
| (7)Hand right | ○ | ○ | ○ | |
| (8)Wrist left | ○ | ○ | ○ | |
| (9)Wrist right | ○ | ○ | ○ | |
| (10)Chest upper-left | ○ | ○ | ○ | ○ |
| (11)Chest upper-right | ○ | ○ | ○ | ○ |
| (12)Chest lower-left | ○ | ○ | ○ | ○ |
| (13)Chest lower-right | ○ | ○ | ○ | ○ |
| (14)Stomach left | ○ | ○ | ○ | ○ |
| (15)Stomach right | ○ | ○ | ○ | ○ |
| (16)Back upper-left | ○ | ○ | ○ | ○ |
| (17)Back upper-right | ○ | ○ | ○ | ○ |
| (18)Back lower-left | ○ | ○ | ○ | |
| (19)Back lower-right | ○ | ○ | ○ | |
| (20)Knee left | ○ | ○ | | |
| (21)Knee right | ○ | ○ | | |
| (22)Foot left | ○ | ○ | ○ | |
| (23)Foot right | ○ | ○ | ○ | |
| (24)-(31)Other0 TO 7 | ○ | | | |

FIG. 8
(a) 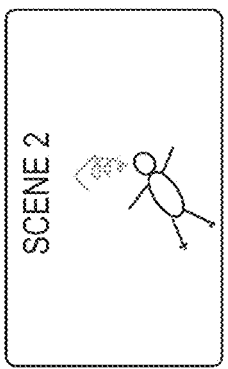 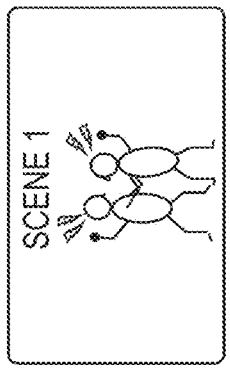
SCENE 1 / SCENE 2
(b)
| | STEREO AUDIO SIGNALS OF TWO CHANNELS | |
|---|---|---|
| Ch0, 1 | TACTILE PRESENTATION SIGNAL Type-1 | TACTILE PRESENTATION SIGNAL Type-2 |
| Ch2 TO 5 | | |
(c) 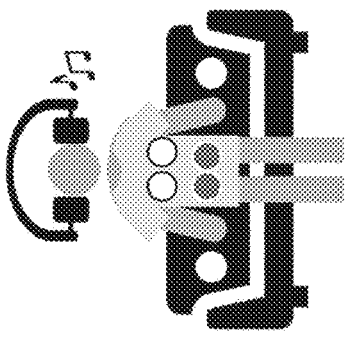 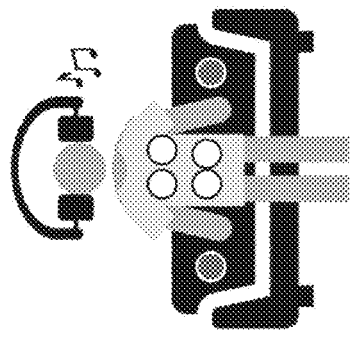

FIG. 9
| TACTILE PRESENTATION POSITION | SCENE 1 | SCENE 2 |
|---|---|---|
| CHEST LEFT | ⓪ | ⓪ |
| CHEST RIGHT | ① | ① |
| STOMACH LEFT | ② | |
| STOMACH RIGHT | ③ | |
| SOFA LEFT | | ② |
| SOFA RIGHT | | ③ |
FIG. 10
(a) 
FADE-OUT AND FADE-IN PROCESSING
(b) 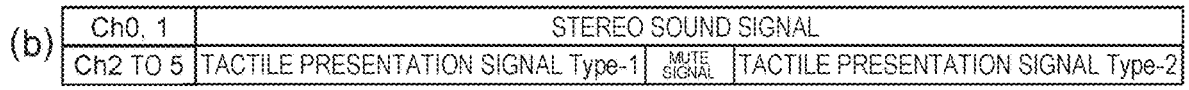

FIG. 18

| | 0 | 1 | 2 | 3 | 4 | 5 | 6 | 7 |
|---|---|---|---|---|---|---|---|---|
| 0 | a="0" | b="0" | c | d="001" : Multichannel LPCM | | | Mode="00" | |
| 1 | | | | | | | | |
| 2 | | | | | | | | |
| 3 | | | | | | | | |
| 4 | | | | | | | | |
| 5 | | | | 44 | 45 | 46 | 47 | |
| 6 | | | | Multichannel Count | | | | |
| 7 | 56 | 57 | 58 | 59 | 60 | 53 | 54 | 55 |
| | Multichannel configuration value | | | | | Multichannel configuration value | | |
| x | xx | xx+1 | xx+2 | xx+3 | xx+4 | xx+5 | xx+6 | xx+7 |
| | | | Haptic channel mapping type | | | | | |
| 23 | | | | | | | | 191 |

FIG. 19

Byte x: Haptic channel mapping type

Bits xx to xx+7

| Bit | xx | xx+1 | xx+2 | xx+3 | xx+4 | xx+5 | xx+6 | xx+7 | |
|---|---|---|---|---|---|---|---|---|---|
| State | "0" | "0" | "0" | "0" | "0" | "0" | "0" | "1" | Type-1 |
| | "0" | "0" | "0" | "0" | "0" | "0" | "1" | "0" | Type-2 |
| | "0" | "0" | "0" | "0" | "0" | "1" | "1" | "1" | Type-3 |
| | "0" | "0" | "0" | "0" | "0" | "1" | "0" | "0" | Type-4 |
| | . . | . . | . . | . . | . . | . . | . . | . . | . . |

FIG. 20

| Type   | Channel 0     | Channel 1      | Channel 2      | Channel 3      |
|--------|---------------|----------------|----------------|----------------|
| Type-1 | Chest left    | Chest right    | Stomach left   | Stomach right  |
| Type-2 | Chest left    | Chest right    | Sofa left      | Sofa right     |
| Type-3 | Stomach left  | Stomach right  | Sofa left      | Sofa right     |
| Type-4 | Chest left    | Stomach left   | Sofa left      | N.A.           |
| ..     | ..            | ..             | ..             | ..             |

FIG. 21

|   | 0 | 1 | 2 | 3 | 4 | 5 | 6 | 7 |
|---|---|---|---|---|---|---|---|---|
| 0 | a="0" | b="0" | c | \multicolumn{3}{c}{d="001" : Multichannel LPCM} | Mode="00" | |
|   | 0 | 1 | 2 | 3 | 4 | 5 | 6 | 7 |
| 1 | | | | | | | | |
| 2 | | | | | | | | |
| 3 | | | | | | | | |
| 4 | | | | | | | | |
| 5 | | | | 44 | 45 Multichannel Count | 46 | 47 | |
| 6 | | | | 53 Multichannel configuration value | 54 | 55 | | |
| 7 | 56 | 57 Multichannel configuration value | 58 | 59 | 60 | | | |
|   | ... | | | | | | | |
| x | xx | xx+1 | xx+2 | xx+3 Haptic channel 0 allocation | xx+4 | xx+5 | xx+6 | xx+7 |
| x+1 | xx+8 | xx+9 | xx+10 | xx+11 Haptic channel 1 allocation | xx+12 | xx+13 | xx+14 | xx+15 |
| x+2 | xx+16 | xx+17 | xx+18 | xx+19 Haptic channel 2 allocation | xx+20 | xx+21 | xx+22 | xx+23 |
| x+3 | xx+24 | xx+25 | xx+26 | xx+27 Haptic channel 3 allocation | xx+28 | xx+29 | xx+30 | xx+31 |
|   | ... | | | | | | | |
| 23 | | | | | | | | 191 |

FIG. 22

Byte x-x+3: Haptic channel allocation

*Bits xx to xx+7* — Haptic channel 0 allocation

| Bit | xx | xx+1 | xx+2 | xx+3 | xx+4 | xx+5 | xx+6 | xx+7 |
|---|---|---|---|---|---|---|---|---|
| State | Chl | Chr | Stl | Str | Sl | Sr | Rsvd | Rsvd |

*Bits xx+8 to xx+15* — Haptic channel 1 allocation

| Bit | xx+8 | xx+9 | xx+10 | xx+11 | xx+12 | xx+13 | xx+14 | xx+15 |
|---|---|---|---|---|---|---|---|---|
| State | Chl | Chr | Stl | Str | Sl | Sr | Rsvd | Rsvd |

*Bits xx+16 to xx+23* — Haptic channel 2 allocation

| Bit | xx+16 | xx+17 | xx+18 | xx+19 | xx+20 | xx+21 | xx+22 | xx+23 |
|---|---|---|---|---|---|---|---|---|
| State | Chl | Chr | Stl | Str | Sl | Sr | Rsvd | Rsvd |

*Bits xx+24 to xx+31* — Haptic channel 3 allocation

| Bit | xx+24 | xx+25 | xx+26 | xx+27 | xx+28 | xx+29 | xx+30 | xx+31 |
|---|---|---|---|---|---|---|---|---|
| State | Chl | Chr | Stl | Str | Sl | Sr | Rsvd | Rsvd |

FIG. 23

| | | |
|---|---|---|
| Chl | Chest left | SET "1" IN CASE OF SIGNAL FOR TACTILE PRESENTATION VEST CHEST LEFT |
| Chr | Chest right | SET "1" IN CASE OF SIGNAL FOR TACTILE PRESENTATION VEST CHEST RIGHT |
| Stl | Stomach left | SET "1" IN CASE OF SIGNAL FOR TACTILE PRESENTATION VEST STOMACH LEFT |
| Str | Stomach right | SET "1" IN CASE OF SIGNAL FOR TACTILE PRESENTATION VEST STOMACH RIGHT |
| S l | Sofa left | SET "1" IN CASE OF SIGNAL FOR TACTILE PRESENTATION SOFA LEFT |
| S r | Sofa right | SET "1" IN CASE OF SIGNAL FOR TACTILE PRESENTATION SOFA RIGHT |

FIG. 24

| | 0 | 1 | 2 | 3 | 4 | 5 | 6 | 7 |
|---|---|---|---|---|---|---|---|---|
| 0 | a="0" | b="0" | c | d="001" : Multichannel LPCM | | | Mode="00" | |
| 1 | | | | | | | | |
| 2 | | | | | | | | |
| 3 | | | | | | | | |
| 4 | | | | | | | | |
| 5 | | | | | 44 | 45 | 46 | 47 |
| 6 | | | | | | | | |
| 7 | 56 Multichannel configuration value | 57 | 58 | 59 | 60 Multichannel Count | 53 Multichannel configuration value | 54 | 55 |
| x | xx Haptic channel 0 position number_1 | xx+1 | xx+2 | xx+3 | xx+4 Haptic channel 0 position number_2 | xx+5 | xx+6 | xx+7 |
| x+1 | xx+8 Haptic channel 1 position number_1 | xx+9 | xx+10 | xx+11 | xx+12 Haptic channel 1 position number_2 | xx+13 | xx+14 | xx+15 |
| x+2 | xx+16 Haptic channel 2 position number_1 | xx+17 | xx+18 | xx+19 | xx+20 Haptic channel 2 position number_2 | xx+21 | xx+22 | xx+23 |
| x+3 | xx+24 Haptic channel 3 position number_1 | xx+25 | xx+26 | xx+27 | xx+28 Haptic channel 3 position number_2 | xx+29 | xx+30 | xx+31 |
| 23 | | | | | | | | 191 |

FIG. 25

| Position number | Position |
|---|---|
| 0000 | Chest left |
| 0001 | Chest right |
| 0010 | Stomach left |
| 0011 | Stomach right |
| 0100 | Sofa left |
| 0101 | Sofa right |

FIG. 26

| TACTILE PRESENTATION POSITION | Scene-1 | Scene-2 | Scene-3 | Scene-4 | Scene-5 | Scene-6 | Scene-7 |
|---|---|---|---|---|---|---|---|
| Head front | | | | | | | ⓪ |
| Head back | | | | | | | ① |
| Head left | | | | | | ② | ② |
| Head right | | | | | | ③ | ③ |
| Shoulder left | | | | | ⓪ | ⓪ | |
| Shoulder right | | | | | ① | ① | |
| Hand left | | | | | | | |
| Hand right | | | | | | | |
| Wrist left | | | | | | | |
| Wrist right | | | | | | | |
| Chest upper-left | | | | ② | ② | | |
| Chest upper-right | | | | ③ | ③ | | |
| Chest lower-left | | | ⓪ | ⓪ | | | |
| Chest lower-right | | | ① | ① | | | |
| Stomach left | | ② | ② | | | | |
| Stomach right | | ③ | ③ | | | | |
| Back upper-left | | | | | | | |
| Back upper-right | | | | | | | |
| Back lower-left | | | | | | | |
| Back lower-right | | | | | | | |
| Knee left | ⓪ | ⓪ | | | | | |
| Knee right | ① | ① | | | | | |
| Foot left | ② | | | | | | |
| Foot right | ③ | | | | | | |

FIG. 27

| TACTILE PRESENTATION POSITION | Scene-1 | Scene-2 | Scene-3 | Scene-4 |
|---|---|---|---|---|
| Head front | ⓪ | | | |
| Head back | ⓪ | | | |
| Head left | ⓪ | | | |
| Head right | ⓪ | | | |
| Shoulder left | ① | | | |
| Shoulder right | ① | | | |
| Hand left | ① | | ⓪ | |
| Hand right | ① | | ① | |
| Wrist left | ① | | ⓪ | |
| Wrist right | ① | | ① | |
| Chest upper-left | ② | ⓪ | ⓪ | ⓪+① |
| Chest upper-right | ② | ⓪ | ① | ⓪+① |
| Chest lower-left | ② | ① | ⓪ | ⓪ |
| Chest lower-right | ② | ① | ① | ⓪ |
| Stomach left | ② | ② | ⓪ | ⓪ |
| Stomach right | ② | ② | ① | ⓪ |
| Back upper-left | ② | | ⓪ | |
| Back upper-right | ② | | ① | |
| Back lower-left | ② | | ⓪ | |
| Back lower-right | ② | | ① | |
| Knee left | ③ | ④ | ⓪ | ② |
| Knee right | ③ | ④ | ① | ② |
| Foot left | ③ | | ⓪ | ③ |
| Foot right | ③ | | ① | ③ |

↑⓪ PRESENTATION OF IMPACT TO ENTIRE BODY
↑① MOVEMENT OF ENTIRE BODY FROM TOP TO BOTTOM
↑② MOVEMENT OF ENTIRE BODY FROM LEFT TO RIGHT
↑③ PRESENTATION TWO TYPES OF IMPACT TO CHEST UPPER
↑④ PRESENTATION OF DIFFERENT IMPACTS TO KNEE AND FOOT

FIG. 29

| | Tactile Presentation Position Designation Flag | | | | | | | | | | | | | | | | | | | | | | | | Tactile Presentation Signal | |
|---|---|---|---|---|---|---|---|---|---|---|---|---|---|---|---|---|---|---|---|---|---|---|---|---|---|---|
| | Part 0 | Part 1 | Part 2 | Part 3 | Part 4 | Part 5 | Part 6 | Part 7 | Part 8 | Part 9 | Part 10 | Part 11 | Part 12 | Part 13 | Part 14 | Part 15 | Part 16 | Part 17 | Part 18 | Part 19 | Part 20 | Part 21 | Part 22 | Part 23 | 0TH CHANNEL TACTILE PRESENTATION SIGNAL | TACTILE PRESENTATION SIGNAL DATA |
| | Part 0 | Part 1 | Part 2 | Part 3 | Part 4 | Part 5 | Part 6 | Part 7 | Part 8 | Part 9 | Part 10 | Part 11 | Part 12 | Part 13 | Part 14 | Part 15 | Part 16 | Part 17 | Part 18 | Part 19 | Part 20 | Part 21 | Part 22 | Part 23 | 1ST CHANNEL TACTILE PRESENTATION SIGNAL | TACTILE PRESENTATION SIGNAL DATA |
| | Part 0 | Part 1 | Part 2 | Part 3 | Part 4 | Part 5 | Part 6 | Part 7 | Part 8 | Part 9 | Part 10 | Part 11 | Part 12 | Part 13 | Part 14 | Part 15 | Part 16 | Part 17 | Part 18 | Part 19 | Part 20 | Part 21 | Part 22 | Part 23 | 2ND CHANNEL TACTILE PRESENTATION SIGNAL | TACTILE PRESENTATION SIGNAL DATA |
| | Part 0 | Part 1 | Part 2 | Part 3 | Part 4 | Part 5 | Part 6 | Part 7 | Part 8 | Part 9 | Part 10 | Part 11 | Part 12 | Part 13 | Part 14 | Part 15 | Part 16 | Part 17 | Part 18 | Part 19 | Part 20 | Part 21 | Part 22 | Part 23 | 3RD CHANNEL TACTILE PRESENTATION SIGNAL | TACTILE PRESENTATION SIGNAL DATA |

FIG. 30

```
Part0:   Head front
Part1:   Head back
Part2:   Head left
Part3:   Head right
Part4:   Shoulder left
Part5:   Shoulder right
Part6:   Hand left
Part7:   Hand right
Part8:   Wrist left
Part9:   Wrist right
Part10:  Chest upper-left
Part11:  Chest upper-right
Part12:  Chest lower-left
Part13:  Chest lower-right
Part14:  Stomach left
Part15:  Stomach right
Part16:  Back upper-left
Part17:  Back upper-right
Part18:  Back lower-left
Part19:  Back lower-right
Part20:  Knee left
Part21:  Knee right
Part22:  Foot left
Part23:  Foot right
```

FIG. 31

| | Part 0 | Part 1 | Part 2 | Part 3 | Part 4 | Part 5 | Part 6 | Part 7 | Part 8 | Part 9 | Part 10 | Part 11 | Part 12 | Part 13 | Part 14 | Part 15 | Part 16 | Part 17 | Part 18 | Part 19 | Part 20 | Part 21 | Part 22 | Part 23 |
|---|---|---|---|---|---|---|---|---|---|---|---|---|---|---|---|---|---|---|---|---|---|---|---|---|
| 0TH CHANNEL TACTILE PRESENTATION SIGNAL / TACTILE PRESENTATION SIGNAL DATA | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1ST CHANNEL TACTILE PRESENTATION SIGNAL / TACTILE PRESENTATION SIGNAL DATA | 0 | 0 | 0 | 1 | 1 | 1 | 1 | 1 | 1 | 1 | 0 | 0 | 0 | 0 | 0 | 0 | 0 | 0 | 0 | 0 | 0 | 0 | 0 | 0 |
| 2ND CHANNEL TACTILE PRESENTATION SIGNAL / TACTILE PRESENTATION SIGNAL DATA | 0 | 0 | 0 | 0 | 0 | 0 | 0 | 0 | 0 | 1 | 1 | 1 | 1 | 1 | 1 | 1 | 1 | 1 | 1 | 0 | 0 | 0 | 0 | 0 |
| 3RD CHANNEL TACTILE PRESENTATION SIGNAL / TACTILE PRESENTATION SIGNAL DATA | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 |

FIG. 32

| | Part 0 | Part 1 | Part 2 | Part 3 | Part 4 | Part 5 | Part 6 | Part 7 | Part 8 | Part 9 | Part 10 | Part 11 | Part 12 | Part 13 | Part 14 | Part 15 | Part 16 | Part 17 | Part 18 | Part 19 | Part 20 | Part 21 | Part 22 | Part 23 |
|---|---|---|---|---|---|---|---|---|---|---|---|---|---|---|---|---|---|---|---|---|---|---|---|---|
| 0TH CHANNEL TACTILE PRESENTATION SIGNAL / TACTILE PRESENTATION SIGNAL DATA | 0 | 0 | 0 | 0 | 0 | 0 | 0 | 0 | 0 | 0 | 1 | 1 | 1 | 1 | 1 | 1 | 0 | 0 | 0 | 0 | 0 | 0 | 0 | 0 |
| 1ST CHANNEL TACTILE PRESENTATION SIGNAL / TACTILE PRESENTATION SIGNAL DATA | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 0 |
| 2ND CHANNEL TACTILE PRESENTATION SIGNAL / TACTILE PRESENTATION SIGNAL DATA | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 0 | 0 |
| 3RD CHANNEL TACTILE PRESENTATION SIGNAL / TACTILE PRESENTATION SIGNAL DATA | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 |

FIG. 33
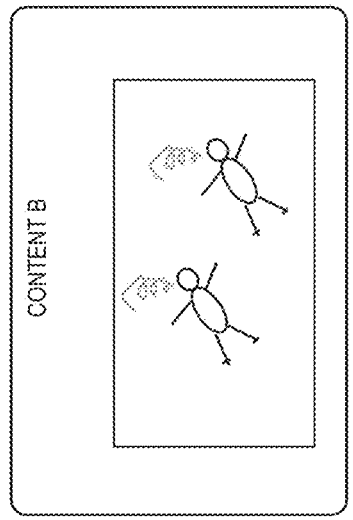
(a1)
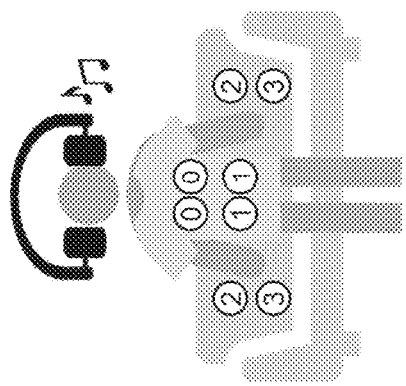
(a2)
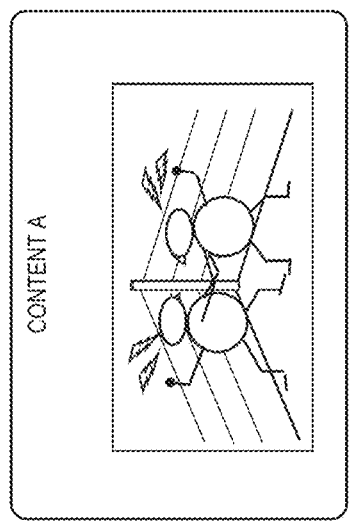
(b1)
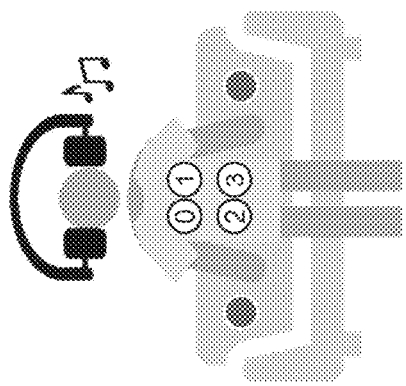
(b2)

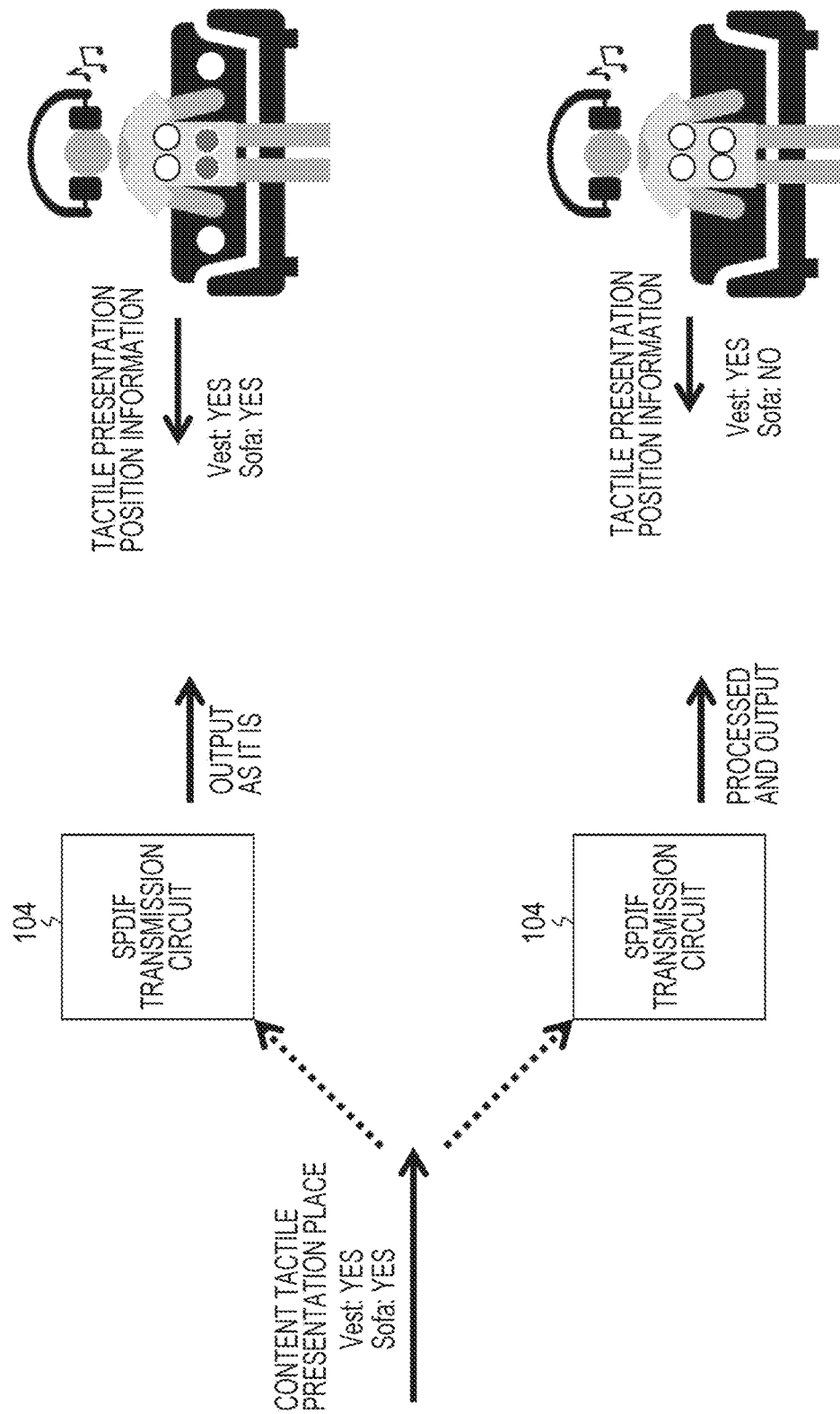

TRANSMISSION APPARATUS, TRANSMISSION METHOD, RECEPTION APPARATUS, AND RECEPTION METHOD FOR DESIGNATING TACTILE PRESENTATION POSITIONS

CROSS REFERENCE TO PRIOR APPLICATION

This application is a National Stage Patent Application of PCT International Patent Application No. PCT/JP2020/046175 (filed on Dec. 10, 2020) under 35 U.S.C. § 371, which claims priority to Japanese Patent Application No. 2019-235306 (filed on Dec. 25, 2019), which are all hereby incorporated by reference in their entirety.

TECHNICAL FIELD

The present technology relates to a transmission apparatus, a transmission method, a reception apparatus, and a reception method, and more particularly, to a transmission apparatus, a transmission method, a reception apparatus, and a reception method that handle a tactile presentation signal together with an audio signal.

BACKGROUND ART

In a multichannel audio application such as 5.1 channel and 7.1 channel, a name is assigned and used to identify each channel usage. Examples include a right channel, a left channel, a center channel, and a low frequency effect (LFE) channel, and the like. These are expected to be delivered to a loudspeaker disposed at the position indicated by the name and reproduced as a sound.

In recent years, multimedia applications have been proposed, and among them, there are tactile presentation applications and the like used in synchronization with conventional audio videos. For example, Patent Document 1 describes a technology for transmitting a tactile vibration signal (tactile signal) and vibrating a vibration unit on the reception side on the basis of the tactile vibration signal.

CITATION LIST

Patent Document

Patent Document 1: Japanese Patent Application Laid-Open No. 2018-060313

SUMMARY OF THE INVENTION

Problems to be Solved by the Invention

The most widespread multichannel audio transmission system is 5.1 channel (six channels in total). In the method of transmitting a stereo audio signal and a tactile presentation signal in an empty channel using this multichannel audio transmission system, tactile presentation is merely performed at four positions, and sufficient tactile production is impossible.

An object of the present technology is to enable tactile presentation at more positions than the number of channels of a tactile presentation signal that can be transmitted.

Solutions to Problems

A concept of the present technology is a transmission apparatus including:

a transmission signal generation unit that generates a transmission signal including audio signals of a predetermined number of channels and tactile presentation signals of a predetermined number of channels and to which metadata designating a tactile presentation position targeted by each of the tactile presentation signals of the predetermined number of channels is added; and a transmission unit that transmits the transmission signal to a reception side via a predetermined transmission path.

In the present technology, the transmission signal is generated by the transmission signal generation unit. The transmission signal includes the audio signals of the predetermined number of channels and the tactile presentation signals of the predetermined number of channels, and the metadata designating the tactile presentation position targeted by each of the tactile presentation signals of the predetermined number of channels is added to the transmission signal. For example, the metadata may designate zero, one, or a plurality of tactile presentation positions as the tactile presentation position targeted by each of the tactile presentation signals of the predetermined number of channels.

The transmission unit transmits the transmission signal to the reception side via the predetermined transmission path. For example, the predetermined transmission path may be a coaxial cable, an optical cable, an Ethernet (IEC 61883-6) cable, an HDMI cable, an MHL cable, or a display port cable.

For example, the transmission signal may be a transmission signal for each block including a plurality of frames, the transmission unit may sequentially transmit the transmission signal for each block to the reception side via the predetermined transmission path, and the transmission signal generation unit may add metadata using a predetermined bit region of a channel status configured for each block. In this case, for example, the plurality of frames may include repetition of a multichannel group including a predetermined number of frames, and the transmission unit may arrange and transmit the audio signals of the predetermined number of channels and the tactile presentation signals of the predetermined number of channels in a time-division manner for each multichannel group on a channel-by-channel basis in all or some of the predetermined number of frames.

As described above, in the present technology, the metadata designating the tactile presentation position targeted by each of the tactile presentation signals of the predetermined number of channels is added to the transmission signal including the audio signals of the predetermined number of channels and the tactile presentation signals of the predetermined number of channels, and the transmission signal is transmitted. Therefore, on the reception side, the tactile presentation signals of the predetermined number of channels can be output as the tactile presentation signals of the target tactile presentation positions on the basis of the metadata, and the tactile presentation can be performed at more positions than the number of channels of the tactile presentation signals that can be transmitted.

Note that, in the present technology, for example, the transmission signal generation unit may dynamically change the metadata to dynamically change the tactile presentation position targeted by each of the tactile presentation signals of the predetermined number of channels. Therefore, on the reception side, the tactile presentation positions targeted by the tactile presentation signals of the predetermined number of channels can be dynamically changed on the basis of the metadata.

In this case, for example, when changing the metadata from a first state to a second state, the transmission signal generation unit may perform fade-out and fade-in processing on the tactile presentation signals of the predetermined number of channels, or may insert a mute signal into the tactile presentation signals of the predetermined number of channels. Therefore, it is possible to alleviate the user's uncomfortable feeling caused by a discontinuous change of the tactile presentation signals of the predetermined number of channels.

Furthermore, in this case, for example, the transmission signal generation unit may dynamically change the metadata in synchronization with the scene of content related to the audio signal. Therefore, it is possible to effectively drive the tactile presentation position suitable for the scene, and to perform appropriate tactile presentation to the user.

Furthermore, another concept of the present technology is a reception apparatus including:

a reception unit that receives, from a transmission side via a predetermined transmission path, a transmission signal including audio signals of a predetermined number of channels and tactile presentation signals of a predetermined number of channels and to which metadata designating a tactile presentation position targeted by each of the tactile presentation signals of the predetermined number of channels is added; and a processing unit that extracts and outputs the audio signal of the predetermined channel from the transmission signal, extracts the tactile presentation signal of the predetermined channel from the transmission signal, and outputs each of the tactile presentation signals of the predetermined channels as a tactile presentation signal of a target tactile presentation position on the basis of the metadata.

In the present technology, the reception unit receives the transmission signal from the transmission side via the predetermined transmission path. The transmission signal includes the audio signals of the predetermined number of channels and the tactile presentation signals of the predetermined number of channels, and the metadata designating the tactile presentation position targeted by each of the tactile presentation signals of the predetermined number of channels is added to the transmission signal. For example, the predetermined transmission path may be a coaxial cable, an optical cable, an Ethernet (IEC 61883-6) cable, an HDMI cable, an MHL cable, or a display port cable.

Furthermore, for example, the transmission signal may be a transmission signal for each block including a plurality of frames, the reception unit may sequentially receive the transmission signal for each block from the transmission side via the predetermined transmission path, and the metadata may be added using a predetermined bit region of a channel status configured for each block. In this case, for example, the plurality of frames may include repetition of a multichannel group including a predetermined number of frames, and the audio signals of the predetermined number of channels and the tactile presentation signals of the predetermined number of channels may be arranged in a time-division manner for each multichannel group on a channel-by-channel basis in all or some of the predetermined number of frames.

The audio signal of a predetermined channel is extracted from the transmission signal and output by the processing unit. Furthermore, the processing unit extracts the tactile presentation signal of the predetermined channel from the transmission signal, and each of the tactile presentation signals of the predetermined channels is output as a tactile presentation signal of a target tactile presentation position on the basis of metadata.

As described above, in the present technology, each of the tactile presentation signals of the predetermined channels extracted from the transmission signal is output as the tactile presentation signal of the target tactile presentation position on the basis of the metadata. Therefore, it is possible to perform tactile presentation at more positions than the number of channels of the tactile presentation signal.

BRIEF DESCRIPTION OF DRAWINGS

FIG. 2 is a diagram illustrating an example of a tactile presentation position range.

FIG. 8 is a diagram for explaining an example of audio-visual content reproduction.

FIG. 9 is a diagram illustrating an example of tactile presentation positions targeted by tactile presentation signals of four channels in Scenes 1 and 2.

FIG. 10 is a diagram for explaining fade-out and fade-in processing and mute signal insertion processing on tactile presentation signals performed at the time of scene switching.

FIG. 18 is a diagram schematically illustrating a format of a channel status according to the IEC 60958 standard.

FIG. 19 is a diagram for explaining a mapping type that designates a tactile presentation position targeted by tactile presentation signals of four channels indicated by an 8-bit field of "Haptic channel mapping type".

FIG. 20 is a diagram for explaining a tactile presentation position targeted by each of tactile presentation signals of four channels predefined for each type.

FIG. 21 is a diagram schematically illustrating a format of a channel status according to the IEC 60958 standard.

FIG. 22 is a diagram for explaining tactile presentation positions indicated by each 8-bit field of "Haptic channel 0 allocation" to "Haptic channel 3 allocation".

FIG. 23 is a diagram for explaining tactile presentation positions indicated by each 8-bit field of "Haptic channel 0 allocation" to "Haptic channel 3 allocation".

FIG. 24 is a diagram schematically illustrating a format of a channel status according to the IEC 60958 standard.

FIG. 25 is a diagram illustrating an example of a correspondence relationship between position numbers and vibration positions.

FIG. 26 is a diagram for explaining another example of audio-visual content reproduction.

FIG. 27 is a diagram for explaining still another example of audio-visual content reproduction.

FIG. 29 is a diagram for explaining an example of adding metadata designating a tactile presentation position targeted by each of tactile presentation signals of four channels to each of the tactile presentation signals.

FIG. 30 is a diagram illustrating an example of a correspondence relationship between each part of tactile presentation position designation flags and tactile presentation positions.

FIG. 31 is a diagram illustrating an example of a state (flag configuration) of each part of tactile presentation position designation flags.

FIG. 32 is a diagram illustrating another example of a state (flag configuration) of each part of tactile presentation position designation flags.

FIG. 33 is a diagram for explaining an example in which a tactile presentation position targeted by each of tactile presentation signals of four channels is switched according to content.

FIG. 35 is a diagram for explaining an example of processing on a television receiver side.

MODE FOR CARRYING OUT THE INVENTION

A mode for carrying out the invention (hereinafter, referred to as "embodiment") will be described below. Note that description will be presented in the following order.
1. Embodiment
2. Variation
<1. Embodiment>
[Configuration Example of AV System]

Figure 1:
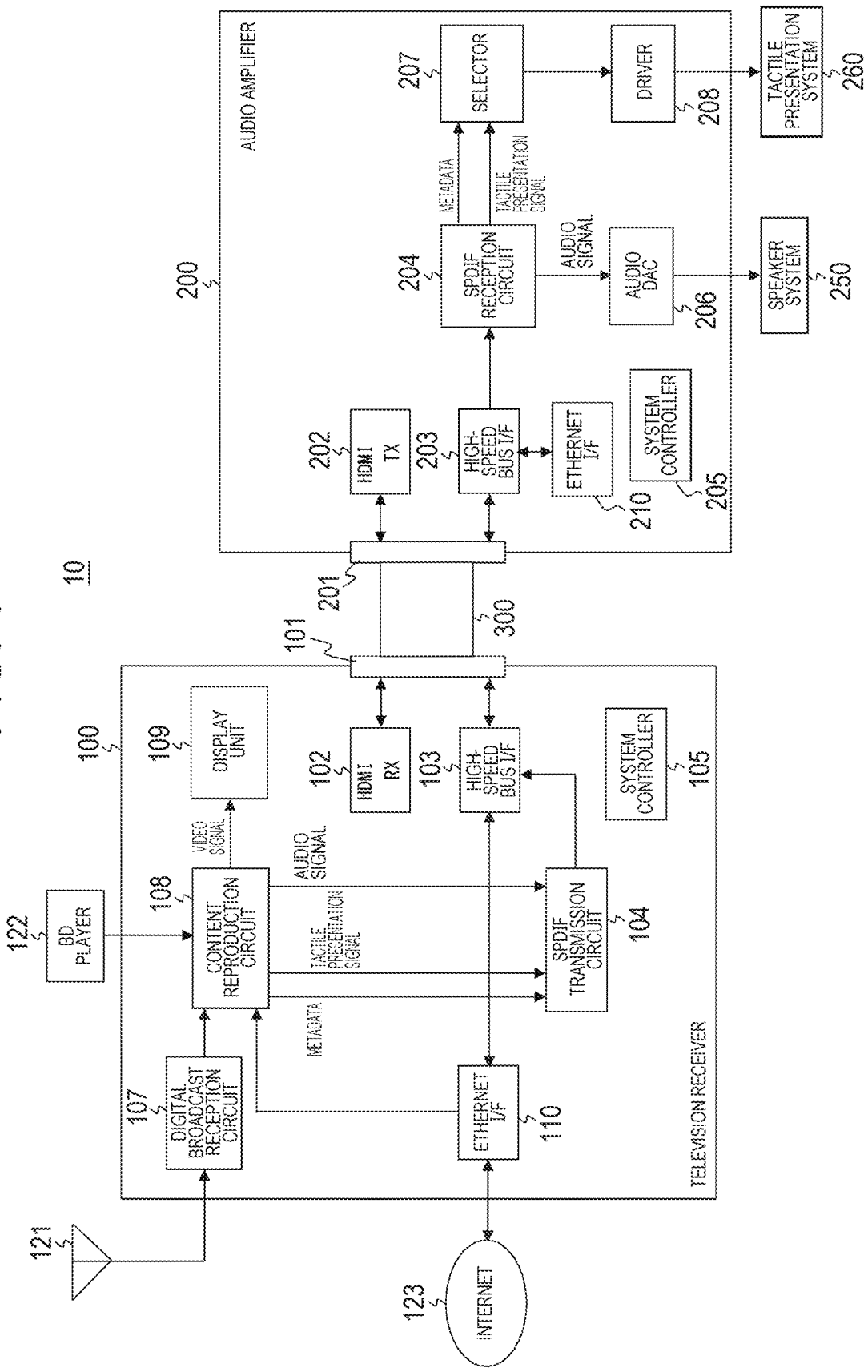
FIG. 1 is a block diagram illustrating a configuration example of an AV system as an embodiment.

FIG. 1 illustrates a configuration example of an audio/visual (AV) system 10 as an embodiment. The AV system 10 includes a television receiver 100 and an audio amplifier 200. A receiving antenna 121 for television broadcasting, a Blu-ray disc (BD) player 122, and the Internet 123 are connected to the television receiver 100. Furthermore, a two-channel or multichannel speaker system 250 and a one-channel or a plural-channel tactile presentation system 260 are connected to the audio amplifier 200. Note that "Blu-ray" is a registered trademark.

The television receiver 100 and the audio amplifier 200 are connected via a high-definition multimedia interface (HDMI) cable 300. Note that "HDMI" is a registered trademark. The television receiver 100 is provided with an HDMI terminal 101 to which an HDMI reception unit (HDMI RX) 102 and a high-speed bus interface 103 constituting a communication unit are connected. The audio amplifier 200 is provided with an HDMI terminal 201 to which an HDMI transmission unit (HDMI TX) 202 and a high-speed bus interface 203 constituting a communication unit are connected. One end of the HDMI cable 300 is connected to the HDMI terminal 101 of the television receiver 100, and the other end thereof is connected to the HDMI terminal 201 of the audio amplifier 200.

The television receiver 100 includes the HDMI reception unit 102, the high-speed bus interface 103, and a Sony Philips Digital Interface (SPDIF) transmission circuit 104. Furthermore, the television receiver 100 includes a system controller 105, a digital broadcast reception circuit 107, a content reproduction circuit 108, a display unit 109, and an Ethernet interface 110. Note that "Ethernet" and "Ethernet" are registered trademarks. Furthermore, in the illustrated example, for the sake of simplicity of description, each unit of the image system is appropriately omitted.

The system controller 105 controls the operation of each unit of the television receiver 100. The digital broadcast reception circuit 107 processes a television broadcast signal input from the receiving antenna 121, and outputs a video signal related to broadcast content, a multichannel audio signal (linear PCM signal), tactile presentation signals of a predetermined number of channels, and metadata designating a tactile presentation position targeted by each of the tactile presentation signals of the predetermined number of channels.

The Ethernet interface 110 communicates with an external server via the Internet 123, and outputs a video signal related to Internet content, a multichannel audio signal (linear PCM signal), tactile presentation signals of a predetermined number of channels, and metadata designating a tactile presentation position targeted by each of the tactile presentation signals of the predetermined number of channels. By the reproduction operation, the BD player 122 outputs a video signal related to reproduction content, a multichannel audio signal (linear PCM signal), tactile presentation signals of a predetermined number of channels, and metadata designating a tactile presentation position targeted by each of the tactile presentation signals of the predetermined number of channels.

Figure 3:
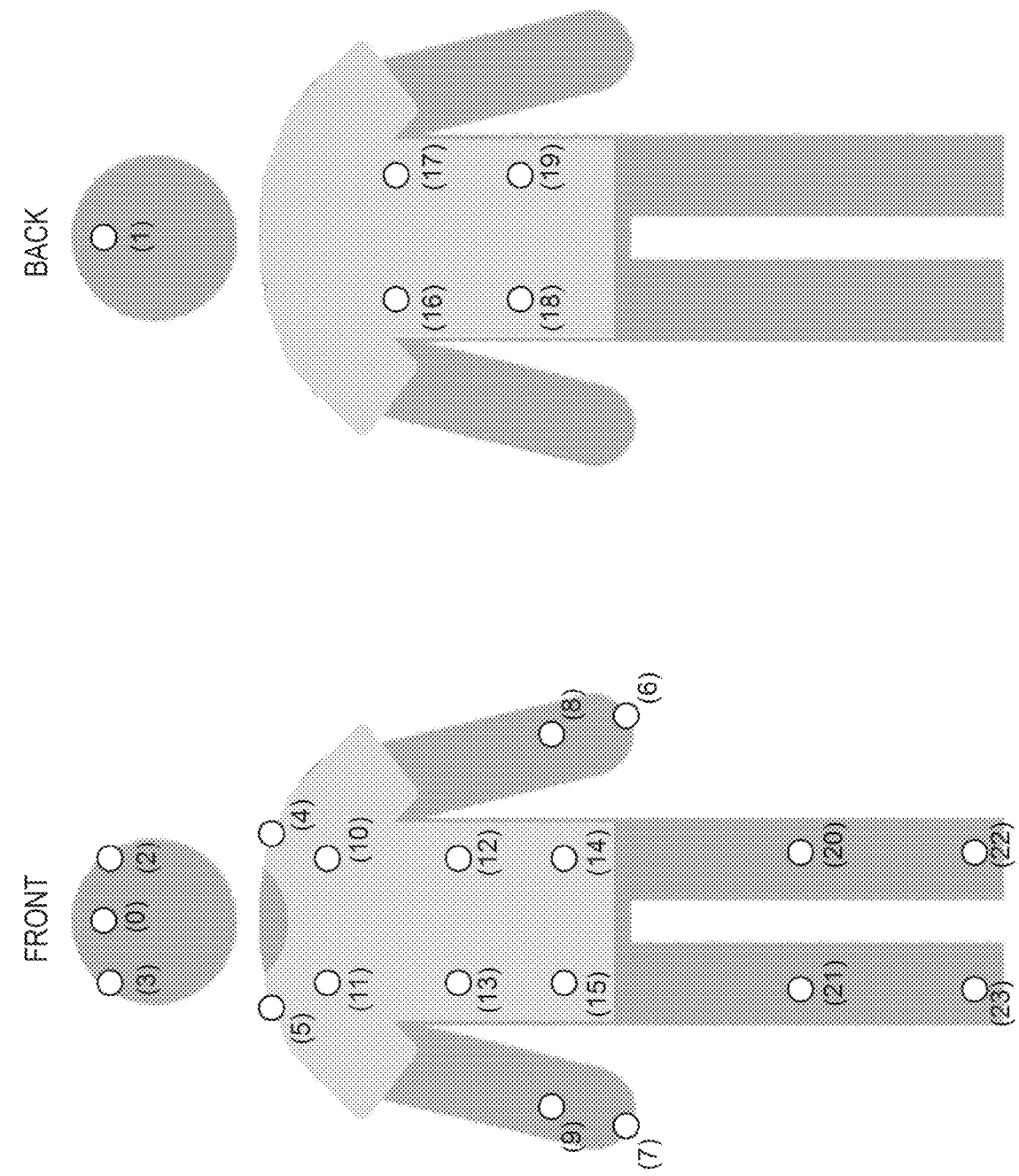
FIG. 3 is a diagram schematically illustrating each tactile presentation position.

The tactile presentation position (tactile presentation site) targeted by the tactile presentation signal of each channel is limited to, for example, a predefined tactile presentation position range. FIG. 2 illustrates an example of a tactile presentation position range. In this example, as the tactile presentation position range, a full-size (32 device) version, a Part-1 size (24 device) version, a Part-2 size (16 device) version, and a Part-3 size (8 device) version are illustrated. FIG. 3 schematically illustrates each tactile presentation position.

Here, the full-size version includes 32 tactile presentation positions: (0) head front "Head front", (1) head back "Head back", (2) head left "Head left", (3) head right "Head right", (4) shoulder left "Shoulder left", (5) shoulder right "Shoulder right", (6) hand left "Hand left", (7) hand right "Hand right", (8) wrist left "Wrist left", (9) wrist right "Wrist right", (10) chest upper-left "Chest upper-left", (11) chest upper-right "Chest upper-right", (12) chest lower-left "Chest lower-left", (13) chest lower-right "Chest lower-right", (14) stomach left "Stomach left", (15) stomach right "Stomach right", (16) back upper-left "Back upper-left", (17) back upper-right "Back upper-right", (18) back lower-left "Back lower-left", (19) back lower-right "Back lower-right", (20) knee left "Knee left", (21) knee right "Knee right", (22) foot left "Foot left", (23) foot right "Foot right", and (24) to (31) others, Furthermore, the Part-1 size version includes 24 tactile presentation positions: (0) head front "Head front", (1) head back "Head back", (2) head left "Head left", (3) head right "Head right", (4) shoulder left "Shoulder left", (5) shoulder right "Shoulder right", (6) hand left "Hand left", (7) hand right "Hand right", (8) wrist left "Wrist left", (9) wrist right "Wrist right", (10) chest upper-left "Chest upper-left", (11) chest upper-right "Chest upper-right", (12) chest lower-left "Chest lower-left", (13) chest lower-right "Chest lower-right", (14) stomach left "Stomach left", (15) stomach right "Stomach right", (16) back upper-left "Back upper-left", (17) back upper-right "Back upper-right", (18) back lower-left "Back lower-left", (19) back lower-right "Back lower-right", (20) knee left "Knee left", (21) knee right "Knee right", (22) foot left "Foot left", and (23) foot right "Foot right".

Furthermore, the Part-2 size version includes 16 tactile presentation positions: (6) hand left "Hand left", (7) hand right "Hand right", (8) wrist left "Wrist left", (9) wrist right "Wrist right", (10) chest upper-left "Chest upper-left", (11) chest upper-right "Chest upper-right", (12) chest lower-left "Chest lower-left", (13) chest lower-right "Chest lower-right", (14) stomach left "Stomach left", (15) stomach right "Stomach right", (16) back upper-left "Back upper-left", (17) back upper-right "Back upper-right", (18) back lower-left "Back lower-left", (19) back lower-right "Back lower-right", (22) foot left "Foot left", and (23) foot right "Foot right".

Furthermore, the Part-3 size version includes 8 tactile presentation positions: (10) chest upper-left "Chest upper-left", (11) chest upper-right "Chest upper-right", (12) chest lower-left "Chest lower-left", (13) chest lower-right "Chest lower-right", (14) stomach left "Stomach left", (15) stomach right "Stomach right", (16) back upper-left "Back upper-left", and (17) back upper-right "Back upper-right".

The tactile presentation position targeted by each of the tactile presentation signals of the predetermined number of channel numbers is changed according to the content or dynamically changed in synchronization with the scene of the content. The metadata designates the tactile presentation position targeted by each of the tactile presentation signals of the predetermined number of channels, and zero, one, or a plurality of tactile presentation positions are conceivable as the tactile presentation position targeted by the tactile presentation signal of one channel.

The content reproduction circuit 108 selectively extracts the video signal, the multichannel audio signal, the tactile presentation signals of the predetermined number of channels, and the metadata obtained by the digital broadcast reception circuit 107, the Ethernet interface 110, or the BD player 122. Then, the content reproduction circuit 108 transmits the video signal to the display unit 109. The display unit 109 displays an image based on the video signal.

Furthermore, the content reproduction circuit 108 transmits the multichannel audio signal and the tactile presentation signals of the predetermined number of channels to the SPDIF transmission circuit 104. The SPDIF transmission circuit 104 is a circuit for transmitting a digital audio transmission signal (hereinafter, appropriately referred to as an "SPDIF signal") of the IEC 60958 standard. The SPDIF transmission circuit 104 is a transmission circuit compliant with the IEC 60958 standard. Note that details of the SPDIF signal will be described later.

The SPDIF transmission circuit 104 simultaneously transmits the multichannel audio signal and the predetermined number of tactile presentation signals to the audio amplifier 200 in a state where the metadata (tactile presentation position information) has been added. In this case, a transmission signal for each block including a plurality of frames, here, 192 frames is sequentially transmitted as the SPDIF signal. Then, the multichannel audio signal and the predetermined number of tactile presentation signals are included in the transmission signal, and the above-described metadata (tactile presentation position information) is further added. For example, the metadata is added using a predetermined bit region of a channel status configured for each block.

Note that the tactile presentation signal is said to have a frequency band of DC –1 kHz. Any digital audio interface capable of transmitting linear PCM can transmit the tactile presentation signal. In this case, for example, in a case where haptic tactile sense is presented, it is possible to express the DC region as "press" when positive and "draw" or "pull" when negative.

Here, the plurality of frames includes repetition of a multichannel group including a predetermined number of frames. The multichannel audio signal and the tactile presentation signals of the predetermined number of channels are arranged in a time-division manner for each multichannel group on a channel-by-channel basis in all or a part of the predetermined number of frames.

The HDMI reception unit 102 receives video or audio data supplied to the HDMI terminal 101 via the HDMI cable 300 by HDMI-compliant communication. The high-speed bus interface 103 is an interface of a bidirectional communication path configured using a reserve line and a hot plug detect (HPD) line constituting the HDMI cable 300. Note that details of the HDMI reception unit 102 and the high-speed bus interface 103 will be described later.

The audio amplifier 200 includes the HDMI transmission unit 202, the high-speed bus interface 203, and an SPDIF reception circuit 204. Furthermore, the audio amplifier 200 includes a system controller 205, an audio DA converter 206, a selector 207, a driver 208, and an Ethernet interface 210.

The system controller 205 controls the operation of each unit of the audio amplifier 200. The HDMI transmission unit 202 transmits video or audio data from the HDMI terminal 201 to the HDMI cable 300 by HDMI-compliant communication. The high-speed bus interface 203 is an interface of a bidirectional communication path configured using a reserve line and a hot plug detect (HPD) line constituting the HDMI cable 300. Note that details of the HDMI transmission unit 202 and the high-speed bus interface 203 will be described later.

The SPDIF reception circuit 204 receives the transmission signal as the SDPIF signal (digital audio signal of the IEC 60958 standard), and acquires the multichannel audio signal and the tactile presentation signals of the predetermined number of channels included in the transmission signal, and further acquires the metadata.

The audio DA converter 206 DA—converts and amplifies the multichannel audio signal extracted by the SPDIF reception circuit 204 for each channel, and transmits the amplified multichannel audio signal to the speaker system 250 having a speaker corresponding to each channel. Therefore, the speaker system 250 performs sound reproduction by the multichannel audio signal.

Furthermore, the selector 207 sorts and outputs the tactile presentation signals of the predetermined number of channels extracted by the SPDIF reception circuit 204 as tactile presentation signals of target tactile presentation positions on the basis of the metadata similarly extracted by the SPDIF reception circuit 204. The driver 208 DA—converts and amplifies the tactile presentation signals of the predetermined number of channels sorted by the selector 207, and transmits the amplified tactile presentation signals to the tactile presentation system 260 having tactile presentation devices at the respective tactile presentation positions.

Therefore, the tactile presentation system 260 performs tactile presentation reproduction at the target tactile presentation positions according to the tactile presentation signals of the predetermined number of channels. In this case, as described above, since the tactile presentation signals of the predetermined number of channels are transmitted simultaneously with the multichannel audio signal, the tactile presentation reproduction is correctly synchronized with the sound reproduction, and are also synchronized with video display on the display unit 109 of the television receiver 100.

Hereinafter, in this embodiment, description will be given on the assumption that the multichannel audio signal is the stereo audio signals of the two channels and the tactile presentation signals of the predetermined number of channels are the tactile presentation signals of the four channels. Note that it is a matter of course that the present technology is not limited to this.

Figure 4:
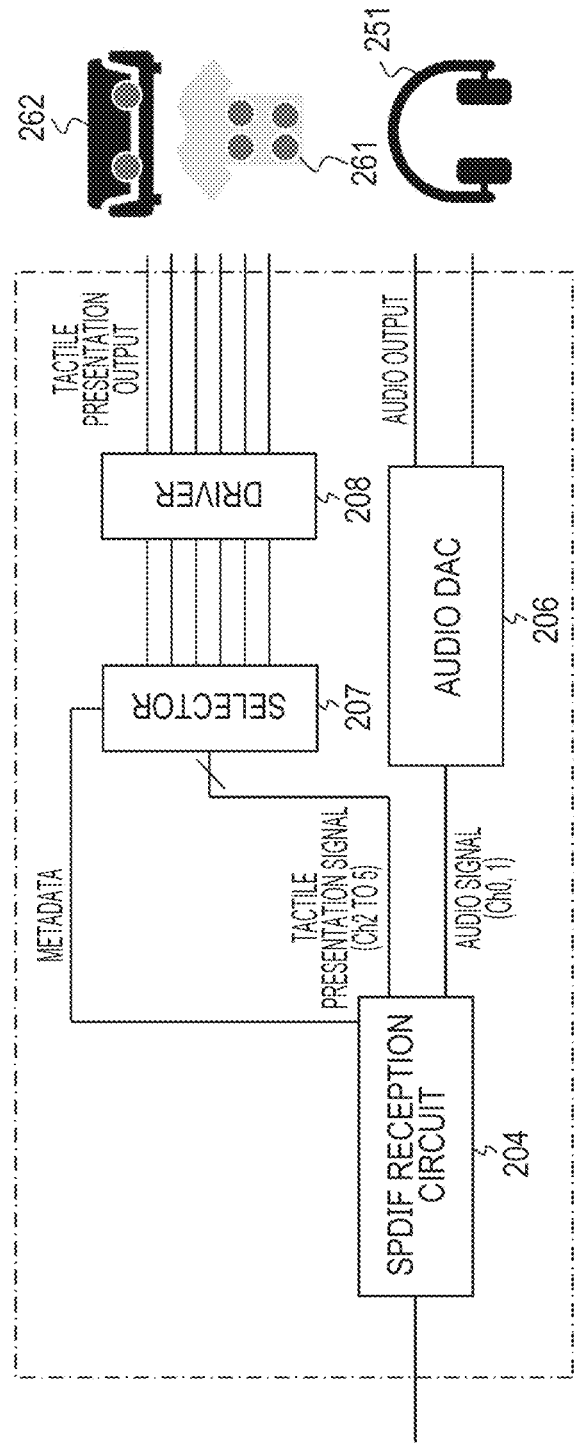
FIG. 4 is a block diagram illustrating a configuration example of portions of a SPDIF reception circuit, an audio DA converter, a selector, and a driver in an audio amplifier.

FIG. 4 illustrates a configuration example of portions of the SPDIF reception circuit 204, the audio DA converter 206, the selector 207, and the driver 208 in the audio amplifier 200. The stereo audio signals of the two channels (signals of Channels 0 and 1) extracted by the SPDIF reception circuit 204 are supplied to the audio DA converter 206. Then, in the audio DA converter 206, the stereo audio signals of the two channels (left sound signal and right sound signal) are DA-converted and amplified, and supplied to a headphone 251, which is the speaker system 250. Therefore, the headphone 251 performs sound reproduction according to the stereo audio signals of the two channels.

Furthermore, the tactile presentation signals of the four channels (signals of Channels 2 to 5) extracted by the SPDIF reception circuit 204 and the metadata designating the tactile presentation position targeted by each of the tactile presentation signals of the four channels are supplied to the selector 207. In the selector 207, the tactile presentation signals of the four channels are sorted and output as tactile presentation signals of target tactile presentation positions (included in the six tactile presentation positions) on the basis of the metadata.

The tactile presentation signals of the four channels sorted by the selector 207 are DA-converted and amplified by the driver 208, and then supplied to a tactile presentation vest 261 having the tactile presentation devices and a corresponding tactile presentation device of a tactile presentation sofa 262, which are the tactile presentation system 260. Therefore, vibration reproduction at each target tactile presentation position is performed by the tactile presentation signals of the four channels.

Note that, in the tactile presentation vest 261 and the tactile presentation sofa 262, a "circle" indicates a tactile presentation position (arrangement position of the tactile presentation device), and there are six tactile presentation positions in total. In the illustrated example, the six tactile presentation positions are sofa left, sofa right, chest left, chest right, stomach left, and stomach right.

Figure 5:
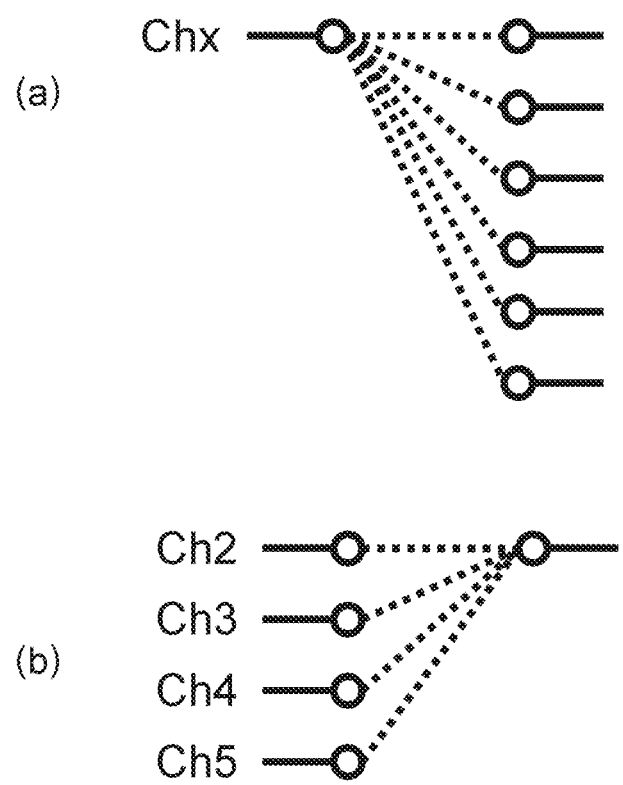
FIG. 5 is a diagram for explaining a tactile presentation signal sorting function included in the selector.

FIG. 5 illustrates a tactile vibration signal sorting function included in the selector 207. As illustrated in FIG. 5(*a*), the selector 207 is configured to be capable of outputting a tactile presentation signal of a certain channel (channel x) as a tactile presentation signal of a predetermined tactile presentation position on the basis of metadata. Furthermore, as illustrated in FIG. 5(*b*), the selector 207 is configured to be capable of outputting tactile presentation signals of a plurality of channels as a tactile presentation signal of a certain tactile presentation position on the basis of metadata.

Figure 6:
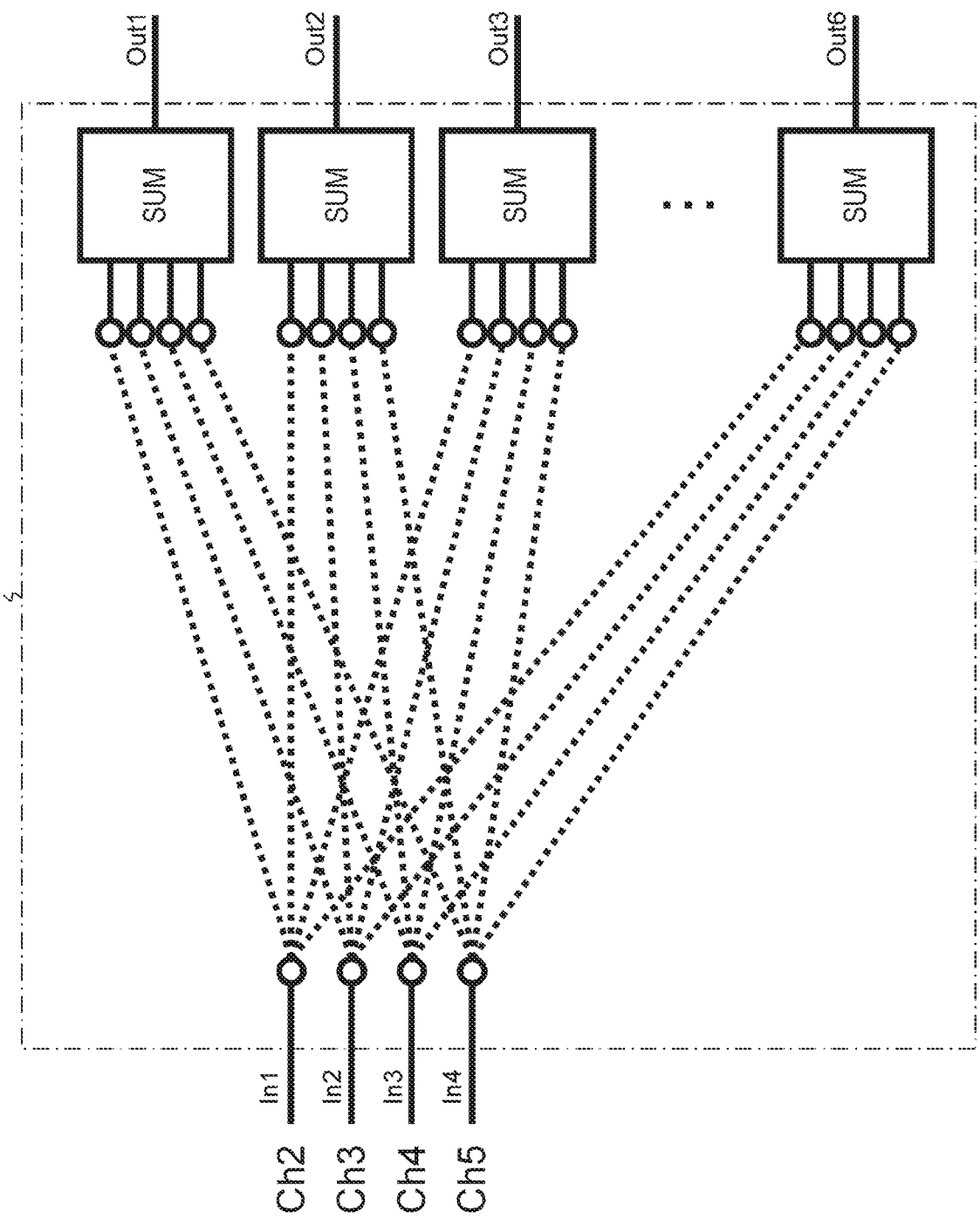
FIG. 6 is a diagram illustrating a configuration example of the selector.

FIG. 6 illustrates a configuration example of the selector 207. The selector 207 has four input systems In1 to In4 for inputting the tactile presentation signals of the four channels as input terminals. Furthermore, the selector 207 has six output systems Out1 to Out6. Then, each output system includes an input unit to which zero, one, or a plurality of tactile presentation signals of the four channels input to the four input systems In1 to In4 is selectively input on the basis of the metadata, and a summation unit that sums and outputs the input tactile presentation signals. With this configuration, the selector 207 exhibits the sorting function illustrated in FIGS. 5(*a*) and 5(*b*) described above.

Figure 7:
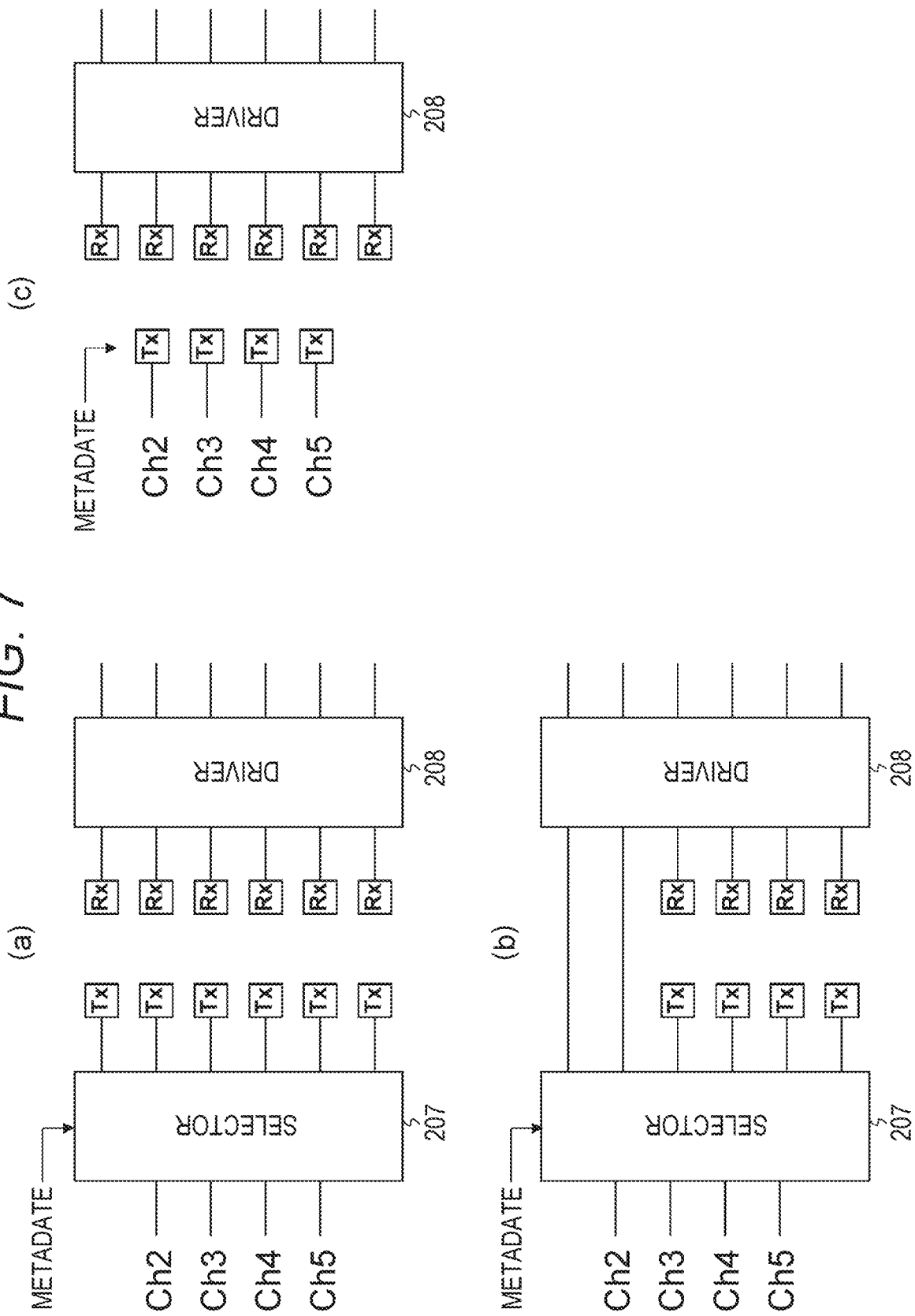
FIG. 7 is a block diagram illustrating a configuration example in a case where some paths of the SPDIF reception circuit, the selector, and the driver are wireless.

FIG. 7 illustrates a configuration example in a case where some paths of the SPDIF reception circuit 204, the selector 207, and the driver 208 are wireless. Here, "Tx" indicates a wireless transmitter, and "Rx" indicates a wireless receiver. In FIG. 7(*a*), all the six paths between the six outputs of the selector 207 and the six inputs of the driver 208 are made wireless. In FIG. 7(*b*), only some paths between the six outputs of the selector 207 and the six inputs of the driver 208, that is, only four paths are made wireless in the illustrated example.

In FIG. 7(*c*), the four outputs of the SPDIF reception circuit 204 and the six inputs of the driver 208 are made wireless. In this case, the transmitter related to the four outputs of the SPDIF reception circuit 204 has the function of the selector 207, and selectively transmits the tactile presentation signal to the receiver related to the six inputs of the driver 208 on the basis of the metadata.

FIG. 8 illustrates an example of audio-visual content reproduction. FIG. 8(*a*) schematically illustrates Scene 1 (scene of fistfight) and Scene 2 (scene of down) in chronological succession. FIG. 8(*b*) illustrates continuous stereo audio signals of two channels and tactile presentation signals of four channels dynamically changing in synchronization with a scene.

The tactile presentation signals of the four channels corresponding to Scene 1 are indicated by Type 1. In this Type 1, the tactile presentation signals of the four channels: the 0th channel, the 1st channel, the 2nd channel, and the 3rd channel are targeted at the vibration positions of the chest left, the chest right, the stomach left, and the stomach right as illustrated in FIG. 9. Note that, in FIG. 9, the circled numbers 0, 1, 2, and 3 indicate the 0th channel, the 1st channel, the 2nd channel, and the 3rd channel, respectively.

Therefore, in Scene 1, on the basis of the metadata, in the selector 207, the tactile presentation signals of the four channels: the 0th channel, the 1st channel, the 2nd channel, and the 3rd channel are output as the tactile presentation signals at the vibration positions of the chest left, the chest right, the stomach left, and the stomach right, respectively. Therefore, in Scene 1, as illustrated in FIG. 8(*c*), tactile presentation reproduction for producing a feeling of being hit is performed at the tactile presentation positions (see the white "circles") of the chest left, the chest right, the stomach left, and the stomach right.

On the other hand, the tactile presentation signals of the four channels corresponding to Scene 2 are indicated by Type 2. In this Type 2, the tactile presentation signals of the four channels: the 0th channel, the 1st channel, the 2nd channel, and the 3rd channel are targeted at the tactile presentation positions of the chest left, the chest right, the sofa left, and the sofa right as illustrated in FIG. 9.

Therefore, in Scene 2, on the basis of the metadata, in the selector 207, the tactile presentation signals of the four channels are output as the tactile presentation signals of the tactile presentation positions of the chest left, the chest right, the sofa left, and the sofa right, respectively. Therefore, in Scene 2, as illustrated in FIG. 8(c), the tactile sense is moved from the front to the back at the tactile presentation positions (see the white "circles") of the chest left, the chest right, the sofa left, and the sofa right so that the tactile presentation reproduction for producing the tactile sense of falling down backward after the impact is performed.

Note that, as illustrated in FIG. 8(b), the stereo audio signals of the two channels are continuously reproduced without discontinuity, and only the tactile presentation signals are switched discontinuously. Since the tactile presentation signals are discontinuous between Scene 1 and Scene 2, it is desirable to perform fade-out and fade-in processing on the tactile presentation signals at the time of switching as illustrated in FIG. 10(a), or to perform mute signal insertion processing on the tactile presentation signals at the time of switching as illustrated in FIG. 10(b). Therefore, it is possible to alleviate the user's uncomfortable feeling caused by a discontinuous change of the tactile presentation signals.

Note that the fade-out and fade-in processing and the mute signal insertion processing may be performed in advance on the television receiver 100 side, may be performed by the selector 207 or the driver 208 of the audio amplifier 200, or may be performed by the tactile presentation vest 261 or the tactile presentation sofa 262.

Figure 11:
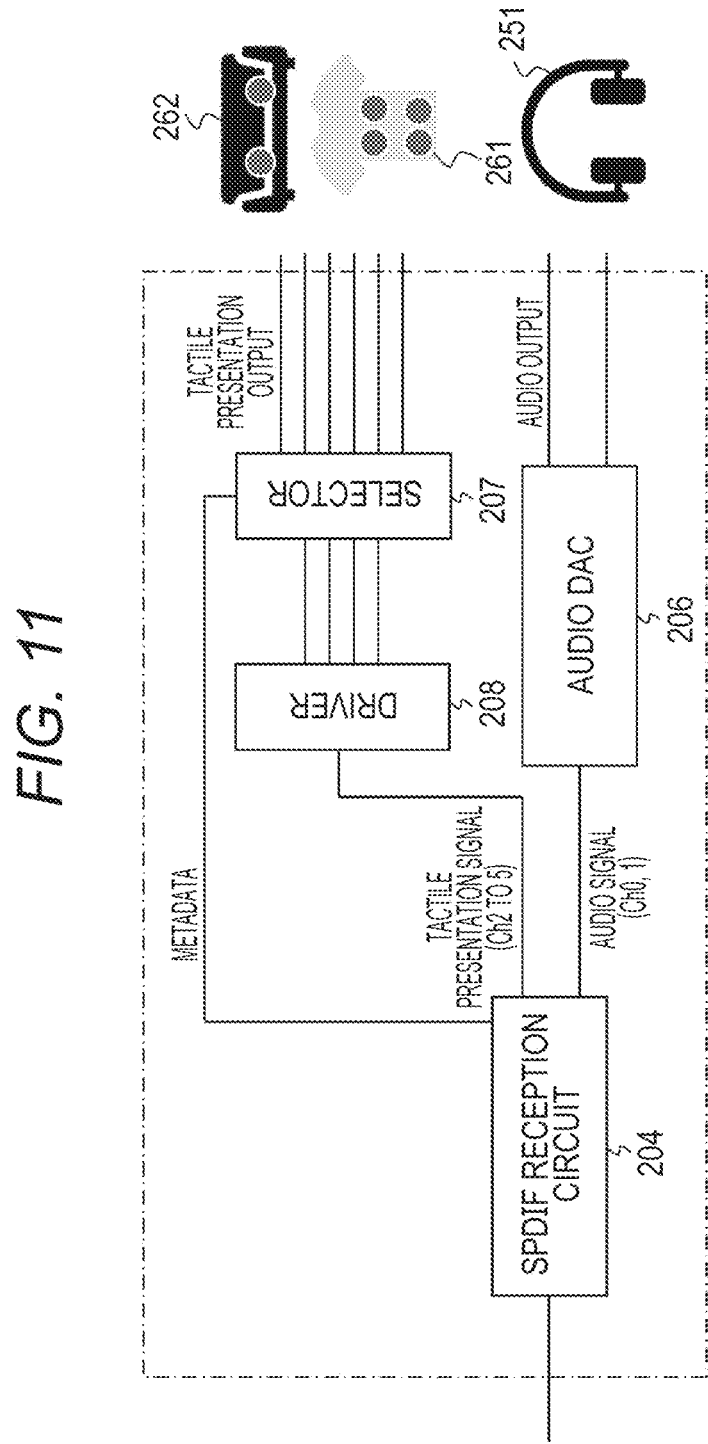
FIG. 11 is a block diagram illustrating another configuration example of portions of a SPDIF reception circuit, an audio DA converter, a selector, and a driver in an audio amplifier.

FIG. 11 illustrates another configuration example of portions of the SPDIF reception circuit 204, the audio DA converter 206, the selector 207, and the driver 208 in the audio amplifier 200. In FIG. 11, portions corresponding to those in FIG. 4 are denoted by the same reference numerals. This another configuration example is different from the configuration example of FIG. 4 in that the connection order of the selector 207 and the driver 208 is reversed, and is similar in other respects.

"Configuration Example of the HDMI Transmission Unit/Reception Unit"

Figure 12:
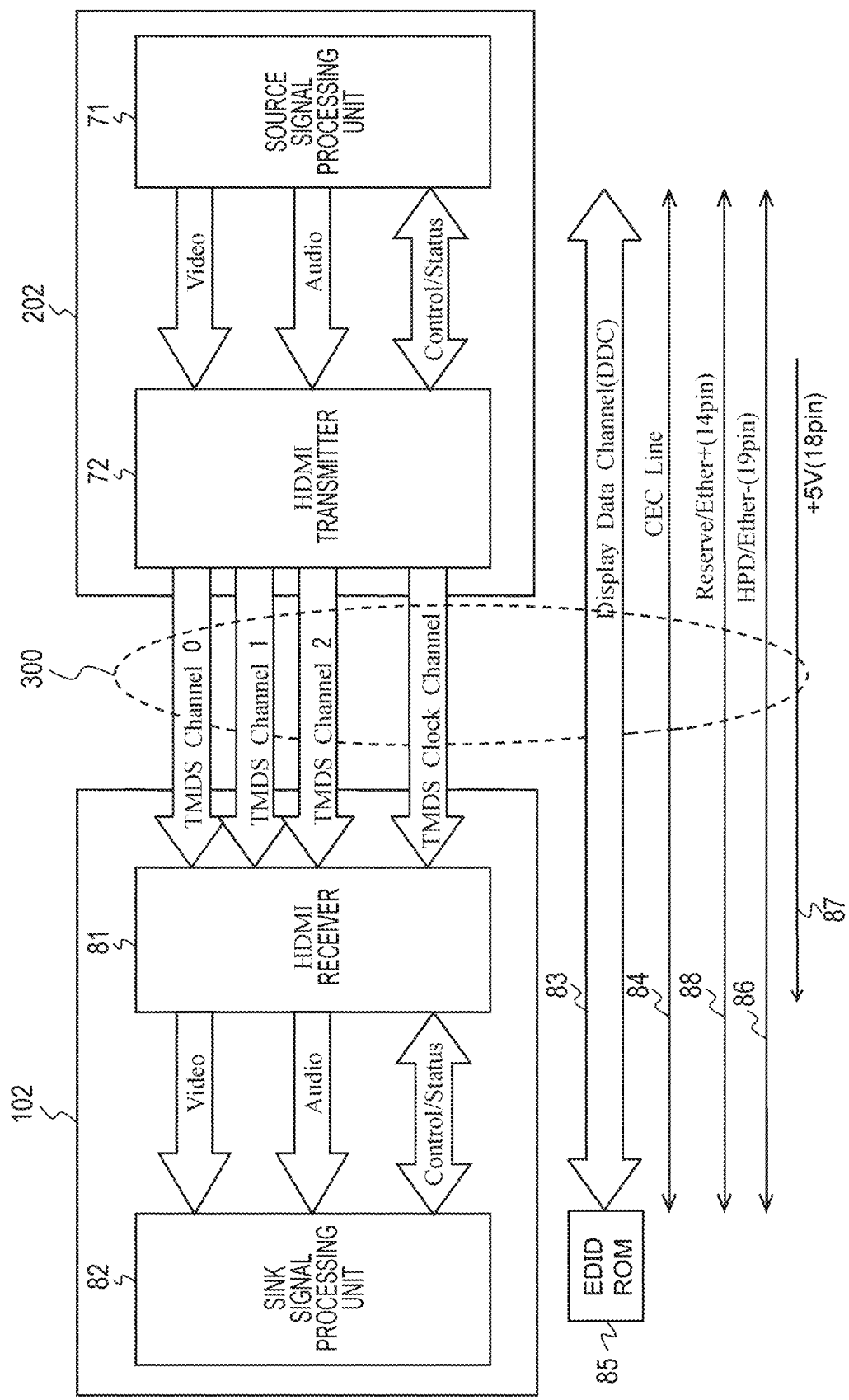
FIG. 12 is a block diagram illustrating a configuration example of an HDMI reception unit of a television receiver and an HDMI transmission unit of an audio amplifier.

FIG. 12 illustrates a configuration example of the HDMI reception unit 102 of the television receiver 100 and the HDMI transmission unit 202 of the audio amplifier 200 in the AV system 10 of FIG. 1.

The HDMI transmission unit 202 transmits a baseband (uncompressed) differential signal of image data for one screen to the HDMI reception unit 102 unidirectionally through a plurality of channels in a valid image section (hereinafter, referred to as an "active video section" as appropriate) that is a section obtained by removing a horizontal blanking period and a vertical blanking period from a section (hereinafter, referred to as a "video field" as appropriate) from a certain vertical synchronization signal to a next vertical synchronization signal. Furthermore, in the horizontal blanking period and the vertical blanking period, the HDMI transmission unit 202 transmits differential signals corresponding to sound data accompanying the image data, a control packet, other auxiliary data, and the like to the HDMI reception unit 102 unidirectionally through a plurality of channels.

The HDMI transmission unit 202 includes a source signal processing unit 71 and an HDMI transmitter 72. Baseband uncompressed image (Video) and sound (Audio) data is supplied to the source signal processing unit 71. The source signal processing unit 71 performs necessary processing on the supplied image and sound data, and supplies the processed data to the HDMI transmitter 72. Furthermore, the source signal processing unit 71 exchanges control information, information for giving a notification of a status (Control/Status), and the like with the HDMI transmitter 72 as necessary.

The HDMI transmitter 72 converts the image data supplied from the source signal processing unit 71 into a corresponding differential signal, and unidirectionally transmits the differential signal to the HDMI reception unit 102 that is connected via the HDMI cable 300 through three TMDS channels #0, #1, and #2, which are a plurality of channels.

Moreover, the sound data accompanying the uncompressed image data, the control packet, and other auxiliary data supplied from the HDMI transmitter 72 and the source signal processing unit 71, and control data such as a vertical synchronization signal (VSYNC) and a horizontal synchronization signal (HSYNC) are converted into corresponding differential signals, and are unidirectionally transmitted to the HDMI reception unit 102 that is connected via the HDMI cable 300 through the three TMDS channels #0, #1, and #2.

Furthermore, the HDMI transmitter 72 transmits a pixel clock synchronized with the image data transmitted through the three TMDS channels #0, #1, and #2 to the HDMI reception unit 102 that is connected via the HDMI cable 300 through a TMDS clock channel.

The HDMI reception unit 102 receives the differential signals corresponding to the image data unidirectionally transmitted from the HDMI transmission unit 202 through the plurality of channels in the active video section, and receives the differential signals corresponding to the auxiliary data and the control data transmitted from the HDMI transmission unit 202 through the plurality of channels in the horizontal blanking period and the vertical blanking period.

The HDMI reception unit 102 includes an HDMI receiver 81 and a sink signal processing unit 82. The HDMI receiver 81 receives the differential signals corresponding to the image data and the differential signals corresponding to the auxiliary data and the control data transmitted unidirectionally from the HDMI transmission unit 202 that is connected via the HDMI cable 300 through the TMDS channels #0, #1, and #2 in synchronization with the pixel clock similarly transmitted from the HDMI transmission unit 202 through the TMDS clock channel. Moreover, the HDMI receiver 81 converts the differential signals into corresponding image data, auxiliary data, and control data, and supplies the data to the sink signal processing unit 82 as necessary.

The sink signal processing unit 82 performs necessary processing on the data supplied from the HDMI receiver 81 and outputs the data. In addition, the sink signal processing unit 82 exchanges control information, information for giving a notification of a status (Control/Status), and the like with the HDMI receiver 81 as necessary.

The HDMI transmission channel includes the three TMDS channels #0, #1, and #2 for serially transmitting the image data, the auxiliary data, and the control data from the HDMI transmission unit 202 to the HDMI reception unit 102 unidirectionally in synchronization with the pixel clock, the TMDS clock channel as a transmission channel for transmitting the pixel clock, a display data channel (DDC) 83, and a transmission channel called a CEC line 84.

The DDC 83 includes two lines (signal lines), which are not illustrated, included in the HDMI cable 300, and is used by a source device to read enhanced-extended display identification (E-EDID) from a sink device connected via the HDMI cable 300. That is, the sink device includes an EDID ROM 85. The source device reads the E-EDID stored in the EDID ROM 85 from the sink device connected via the HDMI cable 300 via the DDC 83, and recognizes the setting and performance of the sink device on the basis of the E-EDID.

The CEC line 84 includes one line, which is not illustrated, included in the HDMI cable 300, and is used to perform bidirectional communication of control data between the source device and the sink device.

Furthermore, the HDMI cable 300 includes a line 86 connected to a pin called hot plug detect (HPD). The source device can detect the connection of the sink device using the line 86. Furthermore, the HDMI cable 300 includes a line 87 used to supply power from the source device to the sink device. Moreover, the HDMI cable 300 includes a reserve line 88.

"Configuration Example of the High-Speed Bus Interface"

Figure 13:
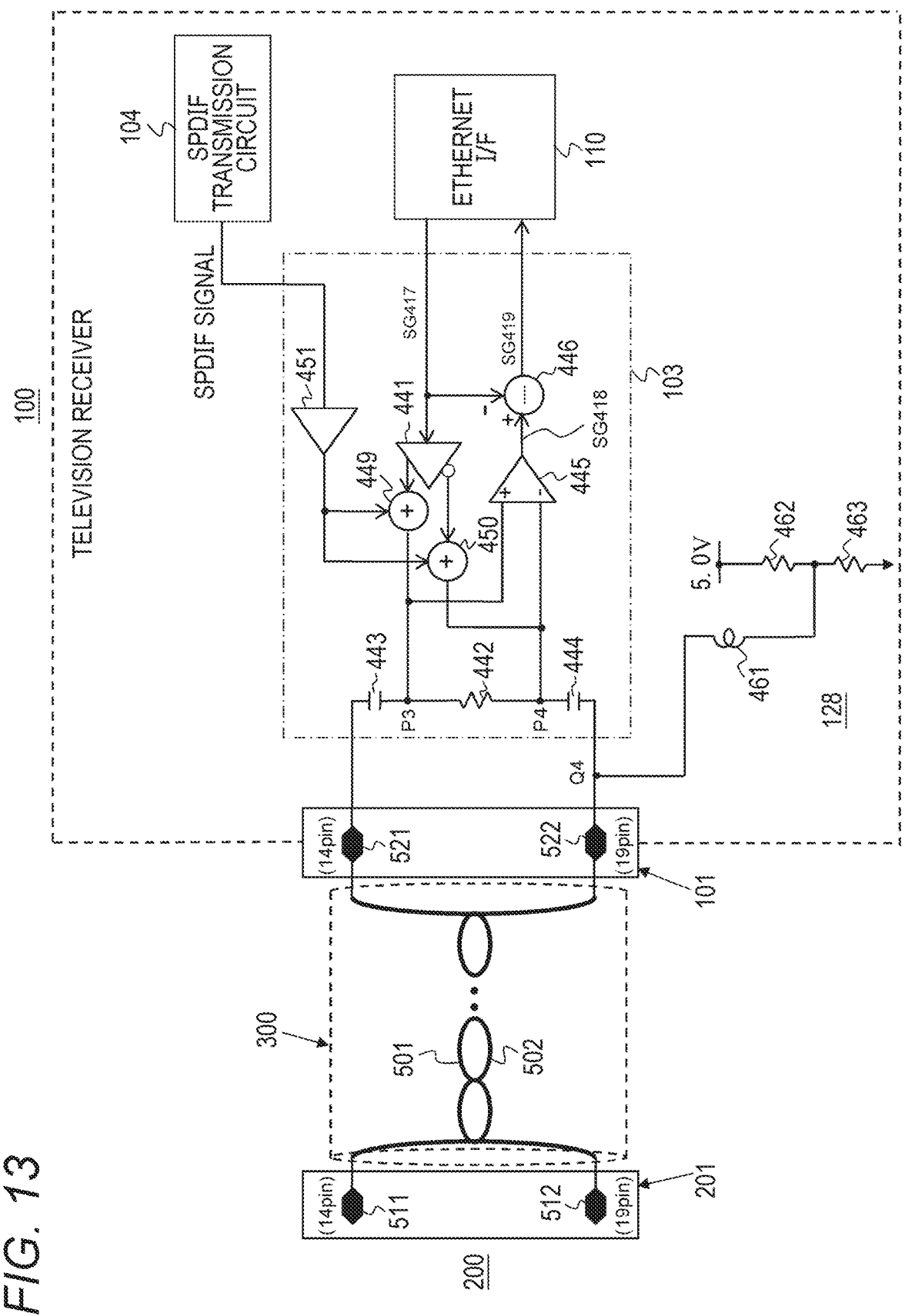
FIG. 13 is a diagram illustrating a configuration example of a high-speed bus interface of a television receiver.

FIG. 13 illustrates a configuration example of the high-speed bus interface 103 of the television receiver 100 in the AV system 10 of FIG. 1. The Ethernet interface 110 performs local area network (LAN) communication, that is, transmission and reception of an Ethernet signal using a transmission path including a pair of lines: the reserve line and the HPD line among the plurality of lines constituting the HDMI cable 300. The SPDIF transmission circuit 104 transmits the SPDIF signal using the transmission path including the above-described pair of lines.

The television receiver 100 includes a LAN signal transmission circuit 441, a termination resistor 442, AC coupling capacitors 443 and 444, a LAN signal reception circuit 445, a subtraction circuit 446, addition circuits 449 and 450, and an amplifier 451. These constitute the high-speed bus interface 103. Furthermore, the television receiver 100 includes a choke coil 461, a resistor 462, and a resistor 463 that constitute a plug connection transmission circuit 128.

A series circuit of the AC coupling capacitor 443, the termination resistor 442, and the AC coupling capacitor 444 is connected between a 14-pin terminal 521 and a 19-pin terminal 522 of the HDMI terminal 101. Furthermore, a series circuit of the resistor 462 and the resistor 463 is connected between a power supply line (+5.0 V) and a ground line. Then, the mutual connection point between the resistor 462 and the resistor 463 is connected to a connection point Q4 between the 19-pin terminal 522 and the AC coupling capacitor 444 via the choke coil 461.

A mutual connection point P3 between the AC coupling capacitor 443 and the termination resistor 442 is connected to an output side of the addition circuit 449 and is connected to a positive input side of the LAN signal reception circuit 445. Furthermore, a mutual connection point P4 between the AC coupling capacitor 444 and the termination resistor 442 is connected to an output side of the addition circuit 450 and is connected to a negative input side of the LAN signal reception circuit 445.

One input side of the addition circuit 449 is connected to a positive output side of the LAN signal transmission circuit 441, and the SPDIF signal output from the SPDIF transmission circuit 104 is supplied to the other input side of the addition circuit 449 via the amplifier 451. Furthermore, one input side of the addition circuit 450 is connected to a negative output side of the LAN signal transmission circuit 441, and the SPDIF signal output from the SPDIF transmission circuit 104 is supplied to the other input side of the addition circuit 450 via the amplifier 451.

A transmission signal (transmission data) SG417 is supplied from the Ethernet interface 110 to an input side of the LAN signal transmission circuit 441. Furthermore, an output signal SG418 of the LAN signal reception circuit 445 is supplied to a positive-side terminal of the subtraction circuit 446, and the transmission signal SG417 is supplied to a negative-side terminal of the subtraction circuit 446. The subtraction circuit 446 subtracts the transmission signal SG417 from the output signal SG418 of the LAN signal reception circuit 445 to obtain a reception signal (reception data) SG419. When a LAN signal (Ethernet signal) is transmitted as a differential signal via the reserve line and the HPD line, the reception signal SG419 becomes the LAN signal. The reception signal SG419 is supplied to the Ethernet interface 110.

Figure 14:
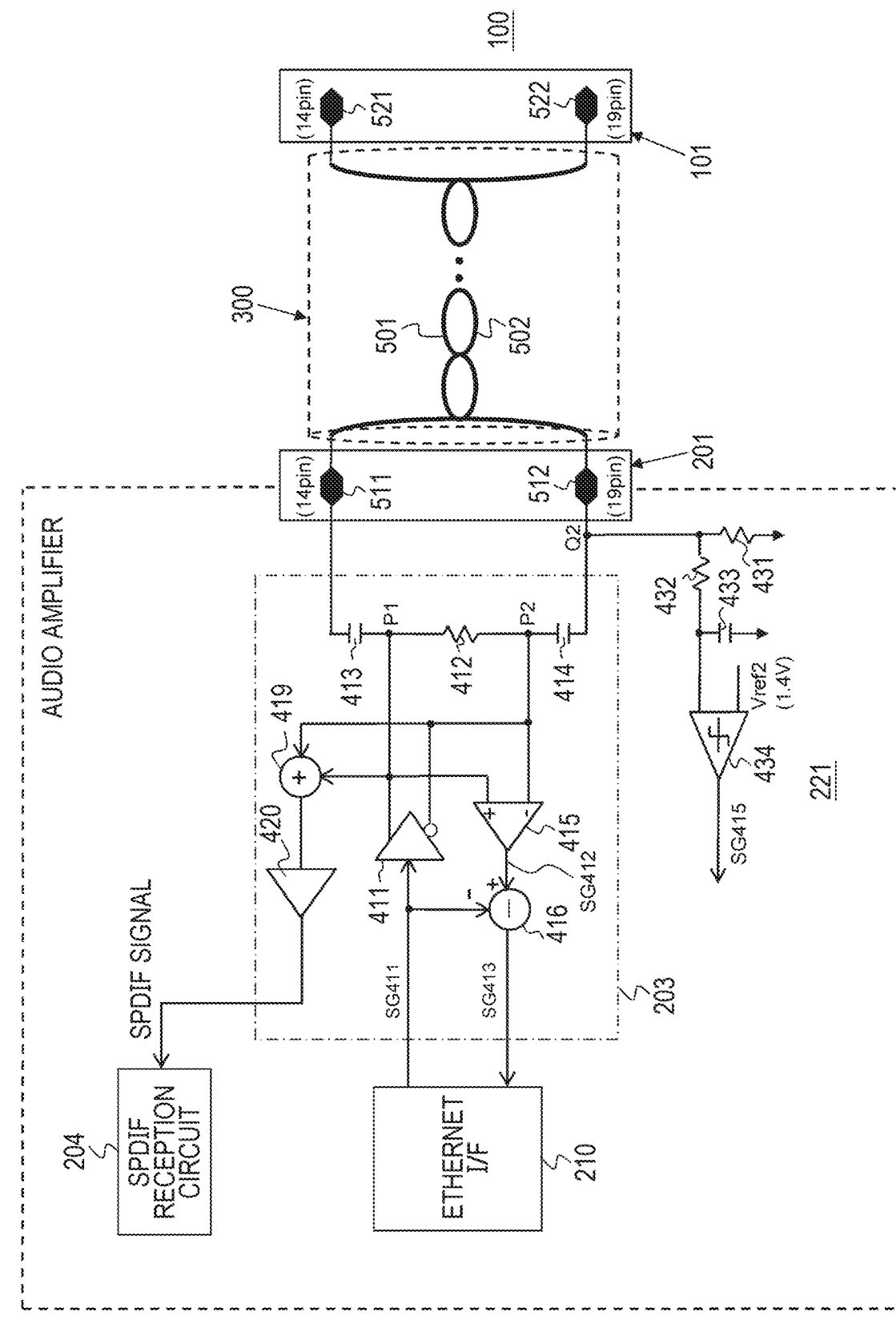
FIG. 14 is a diagram illustrating a configuration example of a high-speed bus interface of an audio amplifier.

FIG. 14 illustrates a configuration example of the high-speed bus interface 203 of the audio amplifier 200 in the AV system 10 of FIG. 1. The Ethernet interface 210 performs local area network (LAN) communication, that is, transmission and reception of an Ethernet signal using a transmission path including a pair of lines: the reserve line and the HPD line among the plurality of lines constituting the HDMI cable 300. The SPDIF reception circuit 204 receives the SPDIF signal using the transmission path including the above-described pair of lines.

The audio amplifier 200 includes a LAN signal transmission circuit 411, a termination resistor 412, AC coupling capacitors 413 and 414, a LAN signal reception circuit 415, a subtraction circuit 416, an addition circuit 419, and an amplifier 420. These constitute the high-speed bus interface 203. Furthermore, the audio amplifier 200 includes a pull-down resistor 431, a resistor 432, a capacitor 433, and a comparator 434 constituting a plug connection detection circuit 221. Here, the resistor 432 and the capacitor 433 constitute a low-pass filter.

A series circuit of the AC coupling capacitor 413, the termination resistor 412, and the AC coupling capacitor 414 is connected between a 14-pin terminal 511 and a 19-pin terminal 512 of the HDMI terminal 201. A mutual connection point P1 between the AC coupling capacitor 413 and the termination resistor 412 is connected to a positive output side of the LAN signal transmission circuit 411 and is connected to a positive input side of the LAN signal reception circuit 415.

A mutual connection point P2 between the AC coupling capacitor 414 and the termination resistor 412 is connected to a negative output side of the LAN signal transmission circuit 411 and is connected to a negative input side of the LAN signal reception circuit 415. A transmission signal (transmission data) SG411 is supplied from the Ethernet interface 210 to an input side of the LAN signal transmission circuit 411.

An output signal SG412 of the LAN signal reception circuit 415 is supplied to a positive-side terminal of the subtraction circuit 416, and the transmission signal (transmission data) SG411 is supplied to a negative-side terminal of the subtraction circuit 416. The subtraction circuit 416 subtracts the transmission signal SG411 from the output signal SG412 of the LAN signal reception circuit 415 to obtain a reception signal SG413. When a LAN signal (Ethernet signal) is transmitted as a differential signal via the reserve line and the HPD line, the reception signal SG413 becomes the LAN signal. The reception signal SG413 is supplied to the Ethernet interface 210.

A connection point Q2 between the AC coupling capacitor 414 and the 19-pin terminal 512 is connected to a ground line via the pull-down resistor 431 and is connected to a ground line via the series circuit of the resistor 432 and the capacitor 433. Then, an output signal of the low-pass filter obtained at a mutual connection point between the resistor 432 and the capacitor 433 is supplied to one input terminal of the comparator 434. In the comparator 434, the output signal of the low-pass filter is compared with a reference voltage Vref2 (+1.4 V) supplied to the other input terminal. An output signal SG415 of the comparator 434 is supplied to a control unit (CPU), which is not illustrated, of the audio amplifier 200.

Furthermore, the mutual connection point P1 between the AC coupling capacitor 413 and the termination resistor 412 is connected to one input terminal of the addition circuit 419. Furthermore, the mutual connection point P2 between the AC coupling capacitor 414 and the termination resistor 412 is connected to the other input terminal of the addition circuit 419. The output signal of the addition circuit 419 is supplied to the SPDIF reception circuit 204 via the amplifier 420. In a case where the SPDIF signal is transmitted as an in-phase signal via the reserve line and the HPD line, the output signal of the addition circuit 419 becomes the SPDIF signal.

"Details of the SPDIF Signal"

Figure 15:
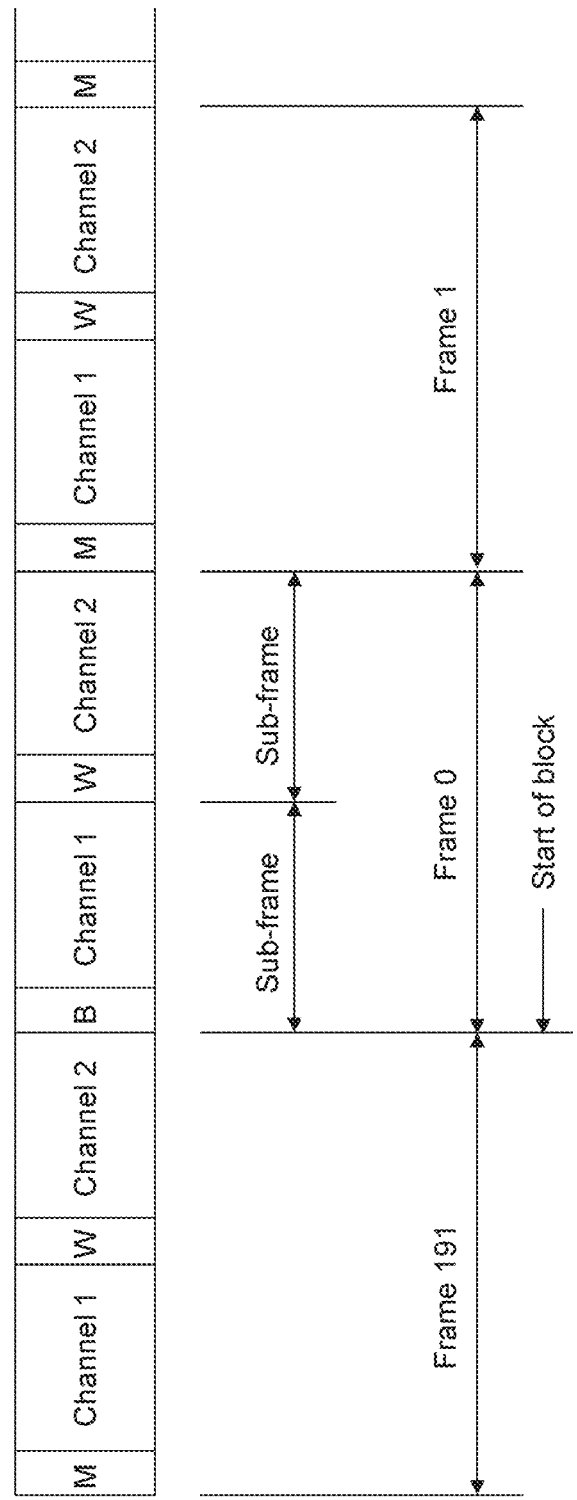
FIG. 15 is a diagram illustrating a frame configuration according to the IEC 60958 standard.

First, an outline of the IEC 60958 standard will be described. FIG. 15 illustrates a frame configuration according to the IEC 60958 standard. Each frame includes two sub-frames. In the case of stereo sounds of two channels, a left channel signal is included in the first sub-frame and a right channel signal is included in the second sub-frame.

As will be described later, a preamble is provided at the head of the sub-frame, and "M" is assigned as the preamble to the left channel signal and "W" is assigned as the preamble to the right channel signal. However, "B" representing the start of the block is assigned to the head preamble for every 192 frames. That is, one block includes 192 frames. The block is a unit constituting a channel status to be described later.

Figure 16:
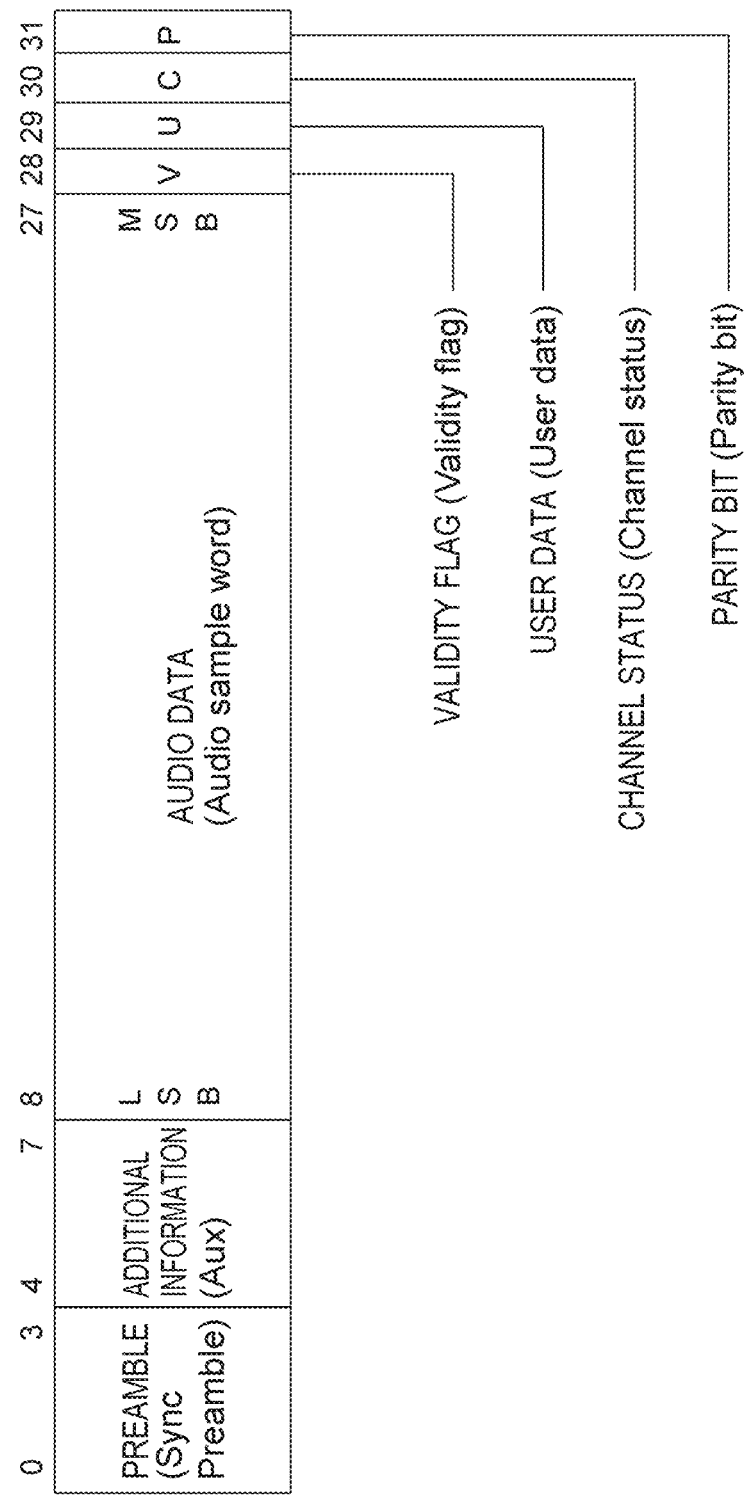
FIG. 16 is a diagram illustrating a sub-frame configuration according to the IEC 60958 standard.

FIG. 16 illustrates a sub-frame configuration according to the IEC 60958 standard. The sub-frame includes a total of 32 time slots from 0th to 31st. The 0th to 3rd time slots indicate a preamble (Sync preamble). As described above, the preamble indicates any "M", "W", and "B" in order to represent the distinction between left and right channels and the start position of the block.

The 4th to 27th time slots are a main data field, and in a case where a 24 bit code range is adopted, the entire time slots represent audio data. Furthermore, in a case where the 20 bit code range is adopted, the 8th to 27th time slots represent audio data (Audio sample word). In the latter case, the 4th to 7th time slots can be used as additional information (Auxiliary sample bits). The illustrated example illustrates the latter case.

The 28th time slot is a validity flag (Validity flag) of the main data field. The 29th time slot represents 1 bit of user data (User data). A series of user data can be configured by accumulating the 29th time slots across each frame. The message of the user data is configured in units of 8-bit information units (IU), and one message includes 3 to 129 information units.

There may be "0" of 0 to 8 bits between the information units. The head of the information unit is identified by a start bit "1". The first seven information units in the message are reserved, and the user may set any information in the 8th and subsequent information units. Messages are divided by "0" of 8 bits or more.

The 30th time slot represents 1 bit of channel status (Channel status). A series of channel statuses can be configured by accumulating the 30th time slots for each block across each frame. Note that the head position of the block is indicated by the preamble "B" (the 0th to 3rd time slots) as described above.

The 31st time slot is a parity bit (Parity bit). This parity bit is assigned so that the numbers of "0" and "1" included in the 4th to 31st time slots are even numbers.

In the present embodiment, using the multichannel transmission format based on the IEC 60958 standard, the above-described stereo audio signals of the two channels and the tactile presentation signals of the four channels are simultaneously transmitted in a state where the metadata designating the tactile presentation positions targeted by each of the tactile presentation signals of the four channels is added.

Figure 17:
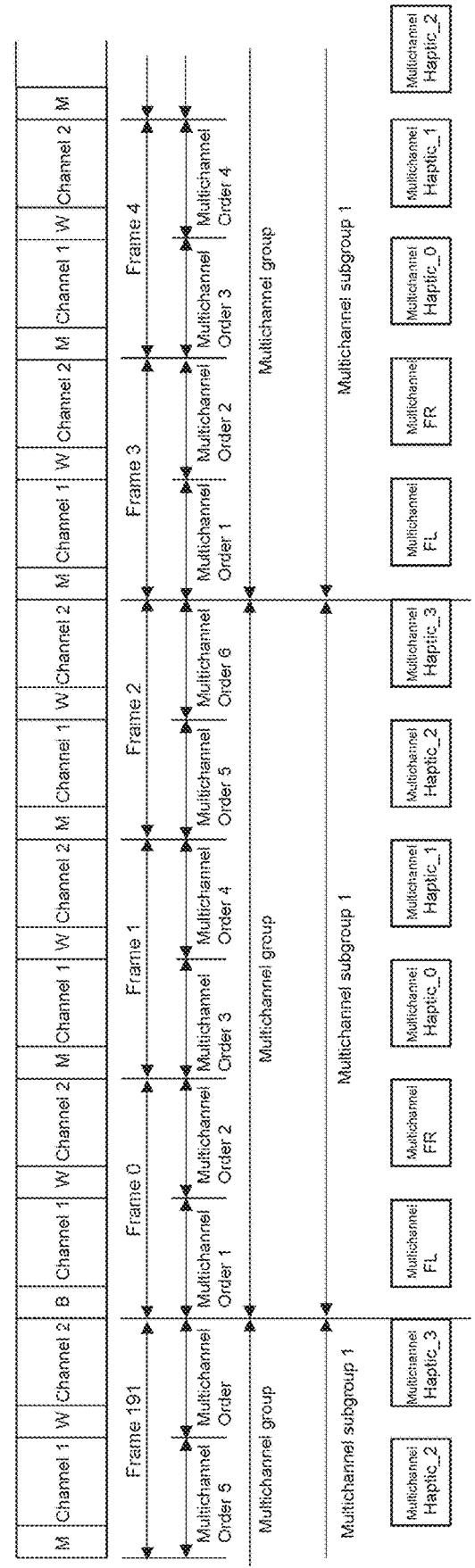
FIG. 17 is a diagram illustrating an example of a frame configuration of a multichannel transmission format in a case where stereo audio signals of two channels and tactile presentation signals of four channels are simultaneously transmitted.

FIG. 17 illustrates an example of a frame configuration of a multichannel transmission format in a case where stereo audio signals of two channels and tactile presentation signals of four channels are simultaneously transmitted.

In the IEC 60958 standard, one block includes 192 frames, and the 192 frames are formed by repetition of a multichannel group (Multichannel group) including a predetermined number of sub-frames. Each sub-frame part constitutes a multichannel order (Multichannel Order). The number of sub-frames to be included in the multichannel group can be indicated by using a predetermined bit region of a channel status configured for each block.

Furthermore, one or a plurality of multichannel subgroups (Multichannel subgroups) for respectively transmitting multichannel audio signals are formed in the multichannel group. A multichannel subgroup includes one or a plurality of multichannel orders. The signals of the respective channels of the multichannel audio signals are sequentially arranged in the respective multichannel orders constituting the multichannel subgroup. What multichannel subgroup is formed in the multichannel group may be indicated by using a predetermined bit region of a channel status configured for each block, and may also be indicated by using user data bits of a predetermined number of frames.

In the illustrated example, one multichannel group includes six sub-frames, that is, Multichannel Orders 1 to 6. Furthermore, one multichannel subgroup: Multichannel subgroup 1 is formed in the multichannel group. Then, in this example, the stereo audio signals of the two channels and the tactile presentation signals of the four channels are simultaneously transmitted by the one multichannel subgroup.

The audio signal of front left (FL), the audio signal of front right (FR), the tactile presentation signal of the 0th channel (Haptic_0), the tactile presentation signal of the 1st channel (Haptic_1), the tactile presentation signal of the 2nd channel (Haptic_2), and the tactile presentation signal of the 3rd channel (Haptic_3) are arranged in this order in Multichannel Orders 1 to 6 constituting Multichannel subgroup 1.

As described above, the metadata designating the tactile presentation position targeted by each of the tactile presentation signals of the four channels is added using, for example, the predetermined bit region of the channel status configured for each block. As a metadata addition method using a predetermined bit region of a channel status, for example, the following first to third methods are conceivable.

"First Method"

The first method is a method of designating, by a mapping type, the tactile presentation position targeted by each of the tactile presentation signals of the four channels.

FIG. 18 schematically illustrates a format of a channel status according to the IEC 60958 standard. The channel status is obtained by accumulating the 30th time slots in the sub-frames for each block (see FIG. 16). In this drawing, the content of the channel status is arranged byte by byte in a vertical direction, and a bit configuration in each byte is illustrated in a horizontal direction. Note that, here, a consumer use format is assumed to be described.

a of the 0th bit (bit 0) is set to "0", indicating that the channel status is for consumer use. Furthermore, b of the first bit (bit 1) is set to "0", indicating that it is a linear PCM sample. Furthermore, the 6th and 7th bits (bits 6 and 7) indicate the mode of the channel status.

Furthermore, the 44th bit to the 47th bit (bits 44 to 47) constitute a 4-bit field of "Multichannel Count", and indicate the number of sub-frames included in the multichannel group. Here, it is indicated that the number of sub-frames included in the multichannel group is "6".

Furthermore, the 53rd to 60th bits constitute an 8-bit field of "Multichannel configuration value", and indicate a configuration of a multichannel subgroup. Here, it is indicated to be a six-channel signal configuration including the stereo audio signals of the two channels and the tactile presentation signals of the four channels.

Furthermore, the xxth bit to the xx+7th bit of the xth byte constitute an 8-bit field of "Haptic channel mapping type", and indicate a mapping type designating the tactile presentation position targeted by each of the tactile presentation signals of the four channels. For example, as illustrated in FIG. 19, "00000001" indicates Type 1 (Type-1), "00000010" indicates Type 2 (Type-2), "00000011" indicates Type 3 (Type-3), and "00000100" indicates Type 4 (Type-4).

In this case, for each type, the tactile presentation position targeted by each of the tactile presentation signals of the four channels is predefined. For example, as illustrated in FIG. 20, in the case of Type 1 (Type-1), the tactile presentation signals of the 0th, 1st, 2nd, and 3rd channels are targeted at chest left (Chest left), chest right (Chest right), stomach left (Stomach left), and stomach right (Stomach right), respectively, in the case of Type 2 (Type-2), the tactile presentation signals of the 0th, 1st, 2nd, and 3rd channels are targeted at chest left, chest right, sofa left (Sofa left), and sofa right (Sofa right), respectively, in the case of Type 3 (Type-3), the tactile presentation signals of the 0th, 1st, 2nd, and 3rd channels are targeted at stomach left, stomach right, sofa left, and sofa right, respectively, and in the case of Type 4 (Type-4), the tactile presentation signals of the 0th, 1st, 2nd, and 3rd channels are targeted at chest left, stomach left, and sofa left, indicating that the 3rd channel is not available (N.A.).

"Second Method"

The second method is a method of designating the tactile presentation position targeted by each of the tactile presentation signals of the four channels by setting a flag to the corresponding bit of a channel allocation.

FIG. 21 schematically illustrates a format of a channel status according to the IEC 60958 standard. In FIG. 21, description of a portion corresponding to that in FIG. 18 will be appropriately omitted.

The 44th bit to the 47th bit (bits 44 to 47) constitute a 4-bit field of "Multichannel Count", and indicate the number of sub-frames included in the multichannel group. Here, it is indicated that the number of sub-frames included in the multichannel group "6".

Furthermore, the 53rd to 60th bits constitute an 8-bit field of "Multichannel configuration value", and indicate a configuration of a multichannel subgroup. Here, it is indicated to be a six-channel signal configuration including the stereo audio signals of the two channels and the tactile presentation signals of the four channels.

Furthermore, the xxth bit to the xx+7th bit of the xth byte constitute an 8-bit field of "Haptic channel 0 allocation", and indicate the channel allocation of the tactile presentation signal of the 0th channel. For example, as illustrated in FIGS. 22 and 23, the xxth bit, the xx+1th bit, the xx+2th bit, the xx+3th bit, the xx+4th bit, and the xx+5th bit correspond to vibration positions of chest left (Chest left), chest right (Chest right), stomach left (Stomach left), stomach right (Stomach right), sofa left (Sofa left), and sofa right (Sofa right), respectively, and when a flag, i.e., "1" is set to the corresponding bit, the tactile presentation position targeted by the tactile presentation signal of the 0th channel is designated.

Furthermore, the xx+8th bit to the xx+15th bit of the x+1th byte constitute an 8-bit field of "Haptic channel 1 allocation", and indicate the channel allocation of the tactile presentation signal of the 1st channel. For example, as illustrated in FIGS. 22 and 23, the xx+8th bit, the xx+9th bit, the xx+10th bit, the xx+11th bit, the xx+12th bit, and the xx+13th bit correspond to tactile presentation positions of chest left (Chest left), chest right (Chest right), stomach left (Stomach left), stomach right (Stomach right), sofa left (Sofa left), and sofa right (Sofa right), respectively, and when a flag, i.e., "1" is set to the corresponding bit, the tactile presentation position targeted by the tactile presentation signal of the 1st channel is designated.

Furthermore, the xx+16th bit to the xx+23th bit of the x+2th byte constitute an 8-bit field of "Haptic channel 2 allocation", and indicate the channel allocation of the tactile presentation signal of the 2nd channel. For example, as illustrated in FIGS. 22 and 23, the xx+16th bit, the xx+17th bit, the xx+18th bit, the xx+19th bit, the xx+20th bit, and the xx+21th bit correspond to vibration positions of chest left (Chest left), chest right (Chest right), stomach left (Stomach left), stomach right (Stomach right), sofa left (Sofa left), and sofa right (Sofa right), respectively, and when a flag, i.e., "1" is set to the corresponding bit, the tactile presentation position targeted by the tactile presentation signal of the 2nd channel is designated.

Furthermore, the xx+24th bit to the xx+31th bit of the x+3th byte constitute an 8-bit field of "Haptic channel 3 allocation", and indicate the channel allocation of the tactile presentation signal of the 3rd channel. For example, as illustrated in FIGS. 22 and 23, the xx+24th bit, the xx+25th bit, the xx+26th bit, the xx+27th bit, the xx+28th bit, and the xx+29th bit correspond to vibration positions of chest left (Chest left), chest right (Chest right), stomach left (Stomach left), stomach right (Stomach right), sofa left (Sofa left), and sofa right (Sofa right), respectively, and when a flag, i.e., "1" is set to the corresponding bit, the tactile presentation position targeted by the tactile presentation signal of the 3rd channel is designated.

"Third Method"

The third method is a method of designating the tactile presentation position targeted by each of the tactile presentation signals of the four channels by a number predefined for the tactile presentation position.

FIG. 24 schematically illustrates a format of a channel status according to the IEC 60958 standard. In FIG. 24, description of a portion corresponding to that in FIG. 18 will be appropriately omitted.

The 44th bit to the 47th bit (bits 44 to 47) constitute a 4-bit field of "Multichannel Count", and indicate the number of sub-frames included in the multichannel group. Here, it is indicated that the number of sub-frames included in the multichannel group is "6.".

Furthermore, the 53rd to 60th bits constitute an 8-bit field of "Multichannel configuration value", and indicate a configuration of a multichannel subgroup. Here, it is indicated to be a six-channel signal configuration including the stereo audio signals of the two channels and the tactile presentation signals of the four channels.

Furthermore, the xxth bit to the xx+3th bit of the xth byte constitute a 4-bit field of "Haptic channel 0 position number_1", and indicate the position number of the first tactile presentation position targeted by the tactile presentation signal of the 0th channel, and the xx+4th bit to the xx+7th bit of the xth byte constitute a 4-bit field of "Haptic channel 0 position number_2", and indicate the position number of the second tactile presentation position targeted by the tactile presentation signal of the 0th channel.

FIG. 25 illustrates an example of a correspondence relationship between position numbers and tactile presentation positions. For example, the position number "0000" indicates chest left (Chest left), the position number "0001" indicates chest right (Chest right), the position number "0010" indicates stomach left (Stomach left), the position number "0011" indicates stomach right (Stomach right), the position number "0100" indicates sofa left (Sofa left), and the position number "0101" indicates sofa right (Sofa right). Note that, in a case where there is no target tactile presentation position, for example, "1111" is set.

Furthermore, the xx+8th bit to the xx+11th bit of the x+1th byte constitute a 4-bit field of "Haptic channel 1 position number_1", and indicate the position number of the first tactile presentation position targeted by the tactile presentation signal of the 1st channel, and the xx+12th bit to the xx+15th bit of the x+1th byte constitute a 4-bit field of "Haptic channel 1 position number_2", and indicate the position number of the second tactile presentation position targeted by the tactile presentation signal of the 1st channel.

Furthermore, the xx+16th bit to the xx+19th bit of the x+2th byte constitute a 4-bit field of "Haptic channel 2 position number_1", and indicate the position number of the first tactile presentation position targeted by the tactile presentation signal of the 2nd channel, and the xx+20th bit to the xx+23th bit of the x+2th byte constitute a 4-bit field of "Haptic channel 2 position number_2", and indicate the position number of the second tactile presentation position targeted by the tactile presentation signal of the 2nd channel.

Furthermore, the xx+24th bit to the xx+27th bit of the x+3th byte constitute a 4-bit field of "Haptic channel 3 position number_1", and indicate the position number of the first tactile presentation position targeted by the tactile presentation signal of the 3rd channel, and the xx+28th bit to the xx+31th bit of the x+3th byte constitute a 4-bit field of "Haptic channel 3 position number_2", and indicate the position number of the second tactile presentation position targeted by the tactile presentation signal of the 3rd channel.

As described above, in the AV system 10 illustrated in FIG. 1, the metadata designating the tactile presentation position targeted by each of the tactile presentation signals of the predetermined number of channels is added to the transmission signal including the audio signals of the predetermined number of channels and the tactile presentation signals of the predetermined number of channels, and the transmission signal is transmitted from the television receiver 100 to the audio amplifier 200. Therefore, on the reception side, the tactile presentation signals of the predetermined number of channels can be output as the tactile presentation signals of the target tactile presentation positions on the basis of the metadata, and the tactile presentation can be performed at more positions than the number of channels of the tactile presentation signals that can be transmitted.

Furthermore, in the AV system 10 illustrated in FIG. 1, the metadata added to the transmission signal can be dynamically changed, for example, in synchronization with the scene in the content, and the tactile presentation position targeted by each of the tactile presentation signals of the predetermined number of channels can be dynamically changed. Therefore, on the reception side, the tactile presentation positions targeted by the tactile presentation signals of the predetermined number of channels can be dynamically changed on the basis of the metadata, and it is possible to perform effective tactile presentation.

<2. Variation>

Note that, in the above-described embodiment, as an example of audio-visual content reproduction, the case where there are six tactile presentation positions (tactile presentation devices): chest left, chest right, stomach left, stomach right, sofa left, and sofa right has been described (see FIGS. 8 and 9).

FIG. 26 illustrates another example of audio-visual content reproduction. This example is an example of the case where there are 24 tactile presentation positions (tactile presentation devices): head front "Head front", head back "Head back", head left "Head left", head right "Head right", shoulder left "Shoulder left", shoulder right "Shoulder right", hand left "Hand left", hand right "Hand right", wrist left "Wrist left", wrist right "Wrist right", chest upper-left "Chest upper-left", chest upper-right "Chest upper-right", chest lower-left "Chest lower-left", chest lower-right "Chest lower-right", stomach left "Stomach left", stomach right "Stomach right", back upper-left "Back upper-left", back upper-right "Back upper-right", back lower-left "Back lower-left", back lower-right "Back lower-right", knee left "Knee left", knee right "Knee right", foot left "Foot left", and foot right "Foot right". Note that, in FIG. 26, the circled numbers 0, 1, 2, and 3 indicate the 0th channel, the 1st channel, the 2nd channel, and the 3rd channel, respectively.

In Scene 1 (Scene-1), the tactile presentation signals of the four channels: the 0th channel, the 1st channel, the 2nd channel, and the 3rd channel are targeted at the tactile presentation positions of the knee left, the knee right, the foot left, and the foot right. Furthermore, in Scene 2 (Scene-2), the tactile presentation signals of the four channels: the 0th channel, the 1st channel, the 2nd channel, and the 3rd channel are targeted at the tactile presentation positions of the knee left, the knee right, the stomach left, and the stomach right. Furthermore, in Scene 3 (Scene-3), the tactile presentation signals of the four channels: the 0th channel, the 1st channel, the 2nd channel, and the 3rd channel are targeted at the tactile presentation positions of the chest lower-left, the chest lower-right, the stomach left, and the stomach right.

Furthermore, in Scene 4 (Scene-4), the tactile presentation signals of the four channels: the 0th channel, the 1st channel, the 2nd channel, and the 3rd channel are targeted at the tactile presentation positions of the chest lower-left, the chest lower-right, the chest upper-left, and the chest upper-right. Furthermore, in Scene 5 (Scene-5), the tactile presentation signals of the four channels: the 0th channel, the 1st channel, the 2nd channel, and the 3rd channel are targeted at the tactile presentation positions of the shoulder left, the shoulder right, the chest lower-left, and the chest lower-right. Furthermore, in Scene 6 (Scene-6), the tactile presentation signals of the four channels: the 0th channel, the 1st channel, the 2nd channel, and the 3rd channel are targeted at the tactile presentation positions of the shoulder left, the shoulder right, the head left, and the head right. Furthermore, in Scene 7 (Scene-7), the tactile presentation signals of the four channels: the 0th channel, the 1st channel, the 2nd channel, and the 3rd channel are targeted at the tactile presentation positions of the head front, the head back, the head left, and the head right.

In this case, as the state changes from Scene 1 to Scene 7, the tactile presentation position targeted by the tactile presentation signals of the four channels moves from the foot to the head for each scene, and the sense that the tactile sense presentation sequentially rises from the foot to the head can be finely expressed.

FIG. 27 illustrates still another example of audio-visual content reproduction. This example is an example of the case where there are 24 tactile presentation positions (tactile presentation devices) similar to the example of FIG. 26. Note that, in FIG. 27, the circled numbers 0, 1, 2, and 3 indicate the 0th channel, the 1st channel, the 2nd channel, and the 3rd channel, respectively.

In Scene 1 (Scene-1), the tactile presentation signal of the 0th channel is targeted at the tactile presentation positions of the head front, the head back, the head left, and the head right, the tactile presentation signal of the 1st channel is targeted at the tactile presentation positions of the shoulder left, the shoulder right, the hand left, the hand right, the wrist left, and the wrist right, the tactile presentation signal of the 2nd channel is targeted at the tactile presentation positions of the chest upper-left, the chest upper-right, the chest lower-left, the chest lower-right, the stomach left, the stomach right, the back upper-left, the back upper-right, the back lower-left, and the back lower-right, and the tactile presentation signal of the 3rd channel is targeted at the tactile presentation positions of the knee left, the knee right, the foot left, and the foot right. Therefore, in Scene 1, all tactile presentation positions are the targets of any of the tactile presentation signals from the 0th channel to the 3rd channel, and for example, it is possible to perform tactile presentation that gives an impact to the entire body.

Furthermore, in Scene 2 (Scene-2), the tactile presentation signal of the 0th channel is targeted at the tactile presentation positions of the chest upper-left and the chest upper-right, the tactile presentation signal of the 1st channel is targeted at the tactile presentation positions of the chest lower-left and the chest lower-right, the tactile presentation signal of the 2nd channel is targeted at the tactile presentation positions of the stomach left and the stomach right, and the tactile presentation signal of the 3rd channel is targeted at the tactile presentation positions of the knee left and the knee right. Therefore, in Scene 2, by giving different tactile senses to the chest upper, the chest lower, the stomach, and the knee, for example, it is possible to perform tactile presentation of moving the entire body from top to bottom or from bottom to top.

Furthermore, in Scene 3 (Scene-3), the tactile presentation signal of the 0th channel is targeted at the tactile presentation positions of the head left, the shoulder left, the hand left, the wrist left, the chest upper-left, the chest lower-left, the stomach left, the back upper-left, the back lower-left, the knee left, and the foot left, and the tactile presentation signal of the 1st channel is targeted at the tactile presentation positions of the head right, the shoulder right, the hand right, the wrist right, the chest upper-right, the chest lower-right, the stomach right, the back upper-right, the back lower-right, the knee right, and the foot right. Therefore, by applying different tactile presentation signals to the left and the right, it is possible to perform tactile presentation of moving the entire body from left to right or from right to left.

Furthermore, in Scene 4 (Scene-4), the tactile presentation signal of the 0th channel is targeted at the tactile presentation positions of the chest upper-left, the chest upper-right, the chest lower-left, the chest lower-right, the stomach left, and the stomach right, the tactile presentation signal of the 1st channel is targeted at the tactile presentation positions of the chest upper-left and the chest upper-right, the tactile presentation signal of the 2nd channel is targeted at the tactile presentation positions of the knee left and the knee right, and the tactile presentation signal of the 3rd channel is targeted at the tactile presentation positions of the foot left and the foot right. Therefore, since the chest upper-left and the chest upper-right are targets of the tactile presentation signal of the 0th channel and the tactile presentation signal of the 1st channel, it is possible to perform tactile presentation of giving a complicated impact to the upper body and giving another impact to the knee and the foot.

Figure 28:
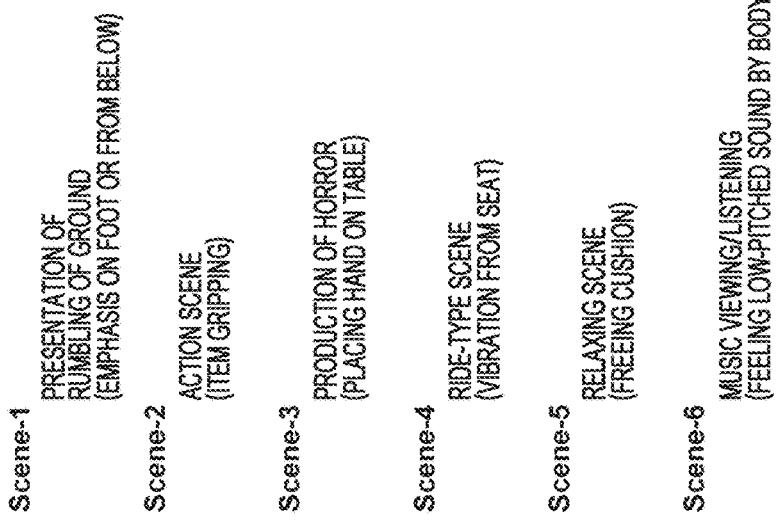
FIG. 28 is a diagram for explaining still another example of audio-visual content reproduction.

FIG. 28 illustrates still another example of audio-visual content reproduction. This example is an example of the case where, in addition to the 24 tactile presentation positions (tactile presentation devices) including head front "Head front", head back "Head back", head left "Head left", head right "Head right", shoulder left "Shoulder left", shoulder right "Shoulder right", hand left "Hand left", hand right "Hand right", wrist left "Wrist left", wrist right "Wrist right", chest upper-left "Chest upper-left", chest upper-right "Chest upper-right", chest lower-left "Chest lower-left", chest lower-right "Chest lower-right", stomach left "Stomach left", stomach right "Stomach right", back upper-left "Back upper-left", back upper-right "Back upper-right", back lower-left "Back lower-left", back lower-right "Back lower-right", knee left "Knee left", knee right "Knee right", foot left "Foot left", and foot right "Foot right", there are 18 tactile presentation positions including sofa backrest left "Sofa backrest left", sofa backrest right "Sofa backrest right", sofa seat front left "Sofa seat front left", sofa seat front right "Sofa seat front right", sofa seat back left "Sofa seat back left", sofa seat back right "Sofa seat back right", floor front left "Floor front left", floor front right "Floor front right", floor back left "Floor back left", floor back right "Floor back right", table left "Table left", table right "Table right", table far left "Table far left", table far right "Table far right", controller left "Controller left", controller right "controller right", cushion A "Cushion A", and cushion B "Cushion B". Note that, in FIG. 28, the circled numbers 0, 1, 2, and 3 indicate the 0th channel, the 1st channel, the 2nd channel, and the 3rd channel, respectively.

In Scene 1 (Scene-1), the tactile presentation signal of the 0th channel is targeted at the tactile presentation positions of the floor front left and the floor front right, the tactile presentation signal of the 1st channel is targeted at the tactile presentation positions of the floor back left and the floor back right, the tactile presentation signal of the 2nd channel is targeted at the tactile presentation positions of the foot left and the foot right, and the tactile presentation signal of the 3rd channel is targeted at the tactile presentation positions of the sofa seat front left, the sofa seat front right, the sofa seat back left, and the sofa seat back right. In this case, for example, it is possible to perform tactile presentation of rumbling of the ground with emphasis on the foot or from below.

Furthermore, in Scene 2 (Scene-2), the tactile presentation signal of the 0th channel is targeted at the tactile presentation position of the controller left, the tactile presentation signal of the 1st channel is targeted at the tactile presentation position of the controller right, the tactile presentation signal of the 2nd channel is targeted at the tactile presentation positions of the chest upper-left, the chest lower-left, and the stomach left, and the tactile presentation signal of the 2nd channel is targeted at the tactile presentation positions of the chest upper-right, the chest lower-right, and the stomach right. In this case, for example, it is possible to perform tactile presentation corresponding to the action scene in which an item is gripped.

Furthermore, in Scene 3 (Scene-3), the tactile presentation signal of the 0th channel is targeted at the tactile presentation positions of the table left and the table far left, the tactile presentation signal of the 1st channel is targeted at the tactile presentation positions of the table right and the table far right, the tactile presentation signal of the 2nd channel is targeted at the tactile presentation position of the sofa backrest left, and the tactile presentation signal of the 3rd channel is targeted at the tactile presentation position of the sofa backrest right. In this case, for example, the production of horror can be performed by placing a hand on the table.

Furthermore, in Scene 4 (Scene-4), the tactile presentation signal of the 0th channel is targeted at the tactile presentation positions of the sofa backrest left and the sofa seat back left, the tactile presentation signal of the 1st channel is targeted at the tactile presentation positions of the sofa backrest right and the sofa seat back right, the tactile presentation signal of the 2nd channel is targeted at the tactile presentation position of the sofa seat front left, and the tactile presentation signal of the 3rd channel is targeted at the tactile presentation position of the sofa seat front right. In this case, for example, it is possible to perform tactile presentation corresponding to the ride-type scene in which vibrations from the seat are received.

Furthermore, in Scene 5 (Scene-5), the tactile presentation signal of the 0th channel is targeted at the tactile presentation position of the cushion A, and the tactile presentation signal of the 1st channel is targeted at the tactile presentation position of the cushion B. In this case, for example, it is possible to perform tactile presentation corresponding to the relaxing scene in which the cushion is freely vibrated.

Furthermore, in Scene 6 (Scene-6), the tactile presentation signal of the 0th channel is targeted at the tactile presentation positions of the sofa backrest left, the sofa seat front left, and the sofa seat back left, the tactile presentation signal of the 1st channel is targeted at the tactile presentation positions of the sofa backrest right, the sofa seat front right, and the sofa seat back right, the tactile presentation signal of the 2nd channel is targeted at the tactile presentation positions of the chest upper-left, the chest lower-left, and the stomach left, and the tactile presentation signal of the 3rd channel is targeted at the tactile presentation positions of the chest upper-right, the chest lower-right, and the stomach right. In this case, for example, it is possible to perform tactile presentation corresponding to music viewing/listening that enables a body to feel a low-pitched sound.

Furthermore, in the above-described embodiment, the example has been described in which the metadata designating the tactile presentation position targeted by each of the tactile presentation signals of the four channels: the 0th channel, the 1st channel, the 2nd channel, and the 3rd channel is added using a predetermined bit region of a channel status configured for each block. For example, in the first method, the tactile presentation positions targeted by the tactile presentation signals of the four channels are designated by mapping type (see FIGS. 18 to 20). In this case, there is a possibility that the number of types becomes excessive due to a large number of combinations.

It is also conceivable to add the metadata designating the tactile presentation position targeted by each of the tactile presentation signals of the four channels: the 0th channel, the 1st channel, the 2nd channel, and the 3rd channel to each of the tactile presentation signals of the four channels as illustrated in FIG. 29, instead of adding the metadata using a predetermined bit region of a channel status configured for each block.

In this case, the tactile presentation position designation flag is given to the tactile presentation signal of each channel. The tactile presentation position designation flag of each channel includes parts corresponding to the number of tactile presentation positions that can be designated. The illustrated example is a case where the number of tactile presentation positions that can be designated is 24, and includes Part 1 (Part 0) to Part 23 (Part 23). FIG. 30 illustrates an example of a correspondence relationship between parts and tactile presentation positions. In this case, by setting "1" to the corresponding part in each channel, one or a plurality of tactile presentation positions targeted by the tactile presentation signal of the channel can be designated.

FIG. 31 illustrates a state (flag configuration) of each part in Scene 1 of the example of FIG. 27 described above. Furthermore, FIG. 32 illustrates a state (flag configuration) of each part in Scene 4 of the example of FIG. 27 described above.

Furthermore, in the above-described embodiment, the example has been described in which the tactile presentation position targeted by each of the tactile presentation signals of the four channels is switched in synchronization with the scene in one piece of content. However, an example is also conceivable in which the tactile presentation position targeted by each of the tactile presentation signals of the four channels is fixed regardless of the scene in one piece of content and the tactile presentation position targeted by each of the tactile presentation signals of the four channels is switched according to content.

For example, in the content of a boxing match as illustrated in FIG. 33(*a*1), emphasis is placed on the expressive power of the tactile presentation to the upper body front surface, and as illustrated in FIG. 33(*a*2), the tactile presentation positions targeted by the tactile presentation signals of the 0th channel, the 1st channel, the 2nd channel, and the 3rd channel are chest right, chest left, stomach right, and stomach left, respectively. Therefore, it is possible to perform fine tactile expression in the upper body front surface, such as presenting an impact to the right chest and then presenting an impact to the left stomach.

Furthermore, in action-type movie content as illustrated in FIG. 33(*b*1), emphasis is placed on the expressive power of the tactile presentation to the front and back surfaces of the upper body, and as illustrated in FIG. 33(*a*2), the tactile presentation positions targeted by the tactile presentation signal of the 0th channel are chest right and chest left, the tactile presentation positions targeted by the tactile presentation signal of the 1st channel are stomach right and stomach left, the tactile presentation positions targeted by the tactile presentation signal of the 2nd channel are back upper-right and back upper-left, and the tactile presentation positions targeted by the tactile presentation signal of the 3rd channel are back lower-right and back lower-left. Therefore, it is possible to express the sense of feeling of moving up and down the upper body or a feeling that the feel comes out back and forth.

In the example described above, the tactile presentation positions targeted by the tactile presentation signals of the 2nd channel and the 3rd channel of content are separated between the back upper and the back lower. However, a case that the tactile presentation position is not divided into upper and lower parts on a terminal side (audio amplifier 200 side) is also assumed. In that case, it is also conceivable to transmit the tactile presentation position information on the terminal side to a source side (television receiver 100) side, perform downmixing processing on the tactile presentation signals of the 2nd channel and the 3rd channel on the source side, and transmit the processed tactile presentation signals to the terminal side. In this case, the tactile presentation reproduction is performed at the tactile presentation positions of the back left and right by the tactile presentation signal having subjected to the downmixing processing. Note that, in this case, it is also conceivable to perform the downmixing processing on the terminal side.

Furthermore, in the above-described embodiment, it has been described that the tactile presentation position targeted by the tactile presentation signal of each channel designated by the metadata is provided on the audio amplifier 200 side (terminal side). However, the case where the tactile presentation position assumed by the television receiver 100 side (source side) is not provided on the audio amplifier 200 side is also conceivable.

Figure 34:
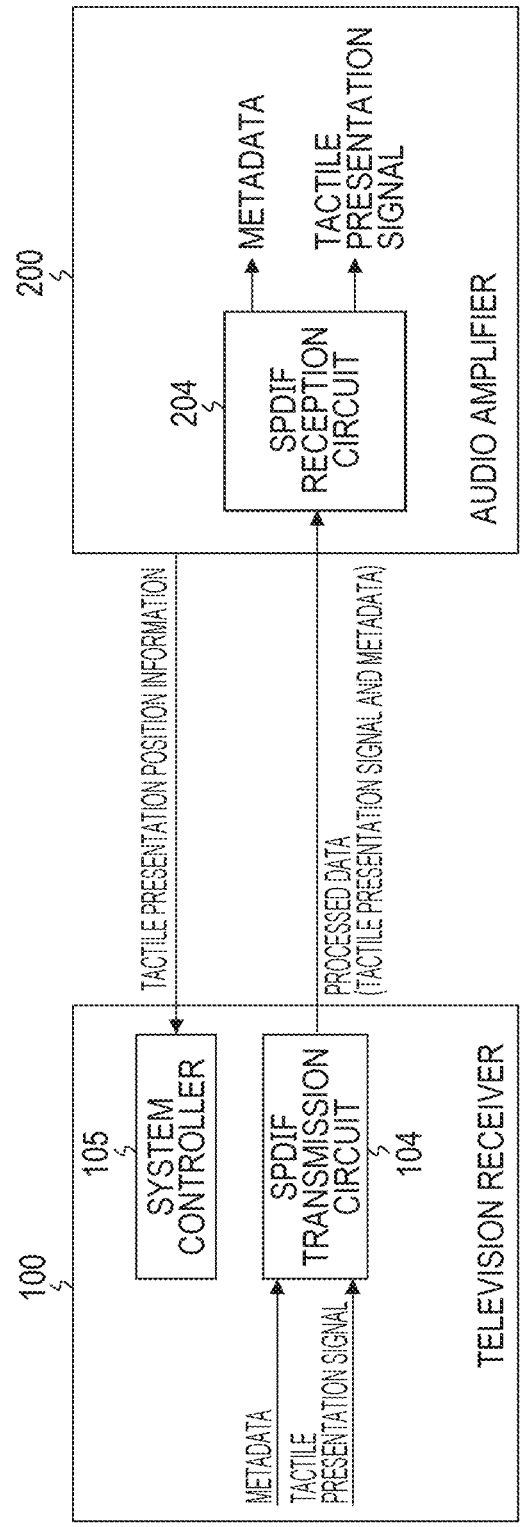
FIG. 34 is a block diagram for explaining an example in which a tactile presentation signal and metadata processed in accordance with a tactile presentation position actually provided on an audio amplifier side are transmitted from a television receiver side to an audio amplifier side.

In this case, as illustrated in FIG. 34, a notification of the tactile presentation position information (tactile presentation device information) may be given from the audio amplifier 200 side to the television receiver 100 side by using some means, for example, an HDMI communication line or the like, and the television receiver 100 side may transmit the tactile presentation signal and the metadata processed in accordance with the tactile presentation position actually provided on the audio amplifier 200 side on the basis of the tactile presentation position information.

This processing is performed in the television receiver 100 by the SPDIF transmission circuit 104, for example, under the control of the system controller 105. This processing includes processing (downmixing processing) of adding the tactile presentation signals of a plurality of channels to target at the tactile presentation position at a close location, processing of discarding the tactile presentation signal of a channel having no appropriate tactile presentation position, processing of sorting the tactile presentation signal of a channel having no corresponding tactile presentation position to one or a plurality of tactile presentation positions at close locations, and the like.

FIG. 35 illustrates an example of processing. It is assumed that there are a vest (Vest) and a sofa (Sofa) as tactile presentation places (tactile presentation positions) of content. In the tactile presentation position information from the terminal side (the audio amplifier 200 side), in a case where there are a vest and a sofa as the tactile presentation position, the SPDIF transmission circuit 104 outputs the tactile presentation signal of a predetermined channel with the vest and the sofa as the tactile presentation position as it is. On the other hand, in a case where there is a vest but there is no sofa as the tactile presentation position in the tactile presentation position information from the terminal side (audio amplifier 200 side), the SPDIF transmission circuit 104 outputs the tactile presentation signal of a predetermined channel with the vest as the tactile presentation position as it is, but regarding the tactile presentation signal of a predetermined channel with the sofa as the tactile presentation position, performs processing of changing the tactile presentation position to the vest and outputs the tactile presentation signal.

Furthermore, in the above-described embodiment, the example has been described in which the multichannel audio signal is stereo audio signals of two channels and the tactile presentation signal of a predetermined number of channels is tactile presentation signals of four channels, but application of the present technology is not limited to this combination.

Furthermore, in the above-described embodiment, the example has been described in which expression such as vibration is mainly used as the tactile presentation signal, but application of the present technology is not limited thereto, and there may be a case where thermal sensation, pressure sensation, or the like is expressed.

Furthermore, in the above-described embodiment, the example of using the HDMI ARC as the IEC 60958 transmission path has been described, but an example of using a coaxial cable or an optical cable as the IEC 60958 transmission path is also conceivable. Furthermore, an example of using an HDMI transmission path as the IEC 60958 transmission path is also conceivable. In this case, the SPDIF signal (IEC 60958 signal) is mapped to an audio sample packet and transmitted in the same forward direction as video transmission. Similarly, an example of using an IEC 61883-6 transmission path, an MHL transmission path, a display port transmission path (DP transmission path), and the like as the IEC 60958 transmission path is also conceivable. Also in these cases, the SPDIF signal (IEC 60958 signal) is mapped to an audio sample packet and transmitted in the same forward direction as video transmission.

Furthermore, the preferred embodiment of the present disclosure has been described above with reference to the accompanying drawings, while the technical scope of the present disclosure is not limited to the above examples. A person skilled in the art may find various alterations and variations within the scope of the appended claims, and it should be understood that they will naturally come under the technical scope of the present disclosure.

Furthermore, the effects described in the present specification are merely illustrative or exemplified effects, and are not limitative. That is, with or in the place of the above effects, the technology according to the present disclosure may achieve other effects that are clear to those skilled in the art from the description of the present specification.

Furthermore, the technology may also adopt the configuration described below.

(1) A transmission apparatus including:

a transmission signal generation unit that generates a transmission signal including audio signals of a predetermined number of channels and tactile presentation signals of a predetermined number of channels and to which metadata designating a tactile presentation position targeted by each of the tactile presentation signals of the predetermined number of channels is added; and a transmission unit that transmits the transmission signal to a reception side via a predetermined transmission path.

(2) The transmission apparatus according to (1), in which the transmission signal generation unit dynamically changes the metadata to dynamically change the tactile presentation position targeted by each of the tactile presentation signals of the predetermined number of channels.

(3) The transmission apparatus according to (1) or (2), in which the transmission signal generation unit performs fade-out and fade-in processing on the tactile presentation signals of the predetermined number of channels when changing the metadata from a first state to a second state.

(4) The transmission apparatus according to (1) or (2), in which the transmission signal generation unit inserts a mute signal to the tactile presentation signals of the predetermined number of channels when changing the metadata from a first state to a second state.

(5) The transmission apparatus according to any of (2) to (4), in which the transmission signal generation unit dynamically changes the metadata in synchronization with a scene of content related to the audio signal.

(6) The transmission apparatus according to any of (1) to (5), in which the metadata designates zero, one, or a plurality of tactile presentation positions as the tactile presentation position targeted by each of the tactile presentation signals of the predetermined number of channels.

(7) The transmission apparatus according to any of (1) to (6), in which the transmission signal includes a transmission signal for each block including a plurality of frames, the transmission unit sequentially transmits the transmission signal for each block to the reception side via the predetermined transmission path, and the transmission signal generation unit adds the metadata using a predetermined bit region of a channel status configured for each block.

(8) The transmission apparatus according to (7), in which the plurality of frames includes repetition of a multichannel group including a predetermined number of frames, and the transmission unit arranges and transmits the audio signals of the predetermined number of channels and the tactile presentation signals of the predetermined number of channels in a time-division manner for each multichannel group on a channel-by-channel basis in all or some of the predetermined number of frames.

(9) The transmission apparatus according to any of (1) to (8), in which the predetermined transmission path includes a coaxial cable, an optical cable, an Ethernet (IEC 61883-6) cable, an HDMI cable, an MHL cable, or a display port cable.

(10) A transmission method including:

a step of generating a transmission signal including audio signals of a predetermined number of channels and tactile presentation signals of a predetermined number of channels and to which metadata designating a tactile presentation position targeted by each of the tactile presentation signals of the predetermined number of channels is added; and a step of transmitting the transmission signal to a reception side via a predetermined transmission path.

(11) A reception apparatus including:

a reception unit that receives, from a transmission side via a predetermined transmission path, a transmission signal including audio signals of a predetermined number of channels and tactile presentation signals of a predetermined number of channels and to which metadata designating a tactile presentation position targeted by each of the tactile presentation signals of the predetermined number of channels is added; and a processing unit that extracts and outputs the audio signal of the predetermined channel from the transmission signal, extracts the tactile presentation signal of the predetermined channel from the transmission signal, and outputs each of the tactile presentation signals of the predetermined channels as a tactile presentation signal of a target tactile presentation position on the basis of the metadata.

(12) The reception apparatus according to (11), in which the processing unit performs fade-out and fade-in processing on the tactile presentation signals of the predetermined number of channels when the metadata is changed from a first state to a second state.

(13) The reception apparatus according to (11), in which the processing unit inserts a mute signal to the tactile presentation signals of the predetermined number of channels when the metadata is changed from a first state to a second state.

(14) The reception apparatus according to any of (11) to (13), in which the transmission signal includes a transmission signal for each block including a plurality of frames, the reception unit sequentially receives the transmission signal for each block from the transmission side via the predetermined transmission path, and the metadata is added using a predetermined bit region of a channel status configured for each block.

(15) The reception apparatus according to (14), in which the plurality of frames includes repetition of a multichannel group including a predetermined number of frames, and the audio signals of the predetermined number of channels and the tactile presentation signals of the predetermined number of channels are arranged in a time-division manner for each multichannel group on a channel-by-channel basis in all or some of the predetermined number of frames.

(16) The reception apparatus according to any of (11) to (15), in which the metadata is dynamically changed in synchronization with a scene of content related to the audio signal.

(17) The reception apparatus according to any of (11) to (16), in which the metadata designates zero, one, or a plurality of tactile presentation positions as the tactile presentation position targeted by each of the tactile presentation signals of the predetermined number of channels.

(18) The reception apparatus according to any of (11) to (17), in which the predetermined transmission path includes a coaxial cable, an optical cable, an Ethernet (IEC 61883-6) cable, an HDMI cable, an MHL cable, or a display port cable.

(19) A reception method including:

a step of receiving, from a transmission side via a predetermined transmission path, a transmission signal including audio signals of a predetermined number of channels and tactile presentation signals of a predetermined number of channels and to which metadata designating a tactile presentation position targeted by each of the tactile presentation signals of the predetermined number of channels is added; and a step of extracting and outputting the audio signal of the predetermined channel from the transmission signal, extracting the tactile presentation signal of the predetermined channel from the transmission signal, and outputting each of the tactile presentation signals of the predetermined channels as a tactile presentation signal of a target tactile presentation position on the basis of the metadata.

REFERENCE SIGNS LIST

10 AV system
100 Television receiver
101 HDMI terminal
102 HDMI reception unit 103 High-speed bus interface
104 SPDIF transmission circuit
105 System controller
107 Digital broadcast reception circuit
108 Content reproduction circuit
109 Display unit
110 Ethernet interface
111 Tactile presentation signal generation unit
121 Receiving antenna
122 BD player
123 Internet
200 Audio amplifier
201 HDMI terminal
202 HDMI transmission unit
203 High-speed bus interface
204 SPDIF reception circuit
205 System controller
206 Audio DA converter
207 Selector
208 Driver
210 Ethernet interface
250 Speaker system
251 Headphone
260 Tactile presentation system
261 Tactile presentation vest
262 Tactile presentation sofa
300 HDMI cable

The invention claimed is:

1. A transmission apparatus comprising:
a transmission signal generation unit configured to generate a transmission signal including audio signals of a predetermined number of channels and tactile presentation signals of a predetermined number of channels and to which metadata designating a tactile presentation position targeted by each of the tactile presentation signals of the predetermined number of channels is added; and
a transmission unit configured to transmit the transmission signal to a reception side via a predetermined transmission path,
wherein the transmission signal generation unit is further configured to perform fade-out and fade-in processing on the tactile presentation signals of the predetermined number of channels or insert a mute signal into the tactile presentation signals of the predetermined number of channels when changing the metadata from a first state to a second state, and
wherein the transmission signal generation unit and the transmission unit are each implemented via at least one processor.

2. The transmission apparatus according to claim 1, wherein
the transmission signal generation unit is further configured to dynamically change the metadata to dynamically change the tactile presentation position targeted by each of the tactile presentation signals of the predetermined number of channels.

3. The transmission apparatus according to claim 2, wherein
the transmission signal generation unit is further configured to perform the fade-out and fade-in processing on the tactile presentation signals of the predetermined number of channels when changing the metadata from the first state to the second state.

4. The transmission apparatus according to claim 2, wherein
the transmission signal generation unit is further configured to insert the mute signal to the tactile presentation signals of the predetermined number of channels when changing the metadata from the first state to the second state.

5. The transmission apparatus according to claim 2, wherein
the transmission signal generation unit is further configured to dynamically change the metadata in synchronization with a scene of content related to the audio signals.

6. The transmission apparatus according to claim 1, wherein
the metadata designates zero, one, or a plurality of tactile presentation positions as the tactile presentation position targeted by each of the tactile presentation signals of the predetermined number of channels.

7. The transmission apparatus according to claim 1, wherein
the transmission signal includes a transmission signal for each block including a plurality of frames,
the transmission unit is further configured to sequentially transmit the transmission signal for each block to the reception side via the predetermined transmission path, and
the transmission signal generation unit is further configured to add the metadata using a predetermined bit region of a channel status configured for each block.

8. The transmission apparatus according to claim 7, wherein
the plurality of frames includes repetition of a multichannel group including a predetermined number of frames, and
the transmission unit is further configured to arrange and transmit the audio signals of the predetermined number of channels and the tactile presentation signals of the predetermined number of channels in a time-division manner for each multichannel group on a channel-by-channel basis in all or some of the predetermined number of frames.

9. The transmission apparatus according to claim 1, wherein
the predetermined transmission path includes a coaxial cable, an optical cable, an Ethernet (IEC 61883-6) cable, an HDMI cable, an MHL cable, or a display port cable.

10. A transmission method comprising:
generating a transmission signal including audio signals of a predetermined number of channels and tactile presentation signals of a predetermined number of channels and to which metadata designating a tactile presentation position targeted by each of the tactile presentation signals of the predetermined number of channels is added;
transmitting the transmission signal to a reception side via a predetermined transmission path; and
performing fade-out and fade-in processing on the tactile presentation signals of the predetermined number of channels or inserting a mute signal into the tactile presentation signals of the predetermined number of channels when changing the metadata from a first state to a second state.

11. A reception apparatus comprising:
a reception unit configured to receive, from a transmission side via a predetermined transmission path, a transmission signal including audio signals of a predetermined number of channels and tactile presentation signals of a predetermined number of channels and to which metadata designating a tactile presentation position targeted by each of the tactile presentation signals of the predetermined number of channels is added; and a processing unit configured to extract and output the audio signal of the predetermined channel from the transmission signal, extract the tactile presentation signal of the predetermined channel from the transmission signal, and output each of the tactile presentation signals of the predetermined channels as a tactile presentation signal of a target tactile presentation position on a basis of the metadata, wherein the processing unit is further configured to perform fade-out and fade-in processing on the tactile presentation signals of the predetermined number of channels or insert a mute signal to the tactile presentation signals of the predetermined number of channels when the metadata is changed from a first state to a second state, and wherein the reception unit and the processing unit are each implemented via at least one processor.

12. The reception apparatus according to claim 11, wherein
the processing unit is further configured to perform the fade-out and fade-in processing on the tactile presentation signals of the predetermined number of channels when the metadata is changed from the first state to the second state.

13. The reception apparatus according to claim 11, wherein
the processing unit is further configured to insert the mute signal to the tactile presentation signals of the predetermined number of channels when the metadata is changed from the first state to the second state.

14. The reception apparatus according to claim 11, wherein
the transmission signal is further configured to include a transmission signal for each block including a plurality of frames,
the reception unit is further configured to sequentially receive the transmission signal for each block from the transmission side via the predetermined transmission path, and
the metadata is added using a predetermined bit region of a channel status configured for each block.

15. The reception apparatus according to claim 14, wherein
the plurality of frames includes repetition of a multichannel group including a predetermined number of frames, and
the audio signals of the predetermined number of channels and the tactile presentation signals of the predetermined number of channels are arranged in a time-division manner for each multichannel group on a channel-by-channel basis in all or some of the predetermined number of frames.

16. The reception apparatus according to claim 11, wherein
the metadata is dynamically changed in synchronization with a scene of content related to the audio signal.

17. The reception apparatus according to claim 11, wherein
the metadata designates zero, one, or a plurality of tactile presentation positions as the tactile presentation position targeted by each of the tactile presentation signals of the predetermined number of channels.

18. The reception apparatus according to claim 11, wherein
the predetermined transmission path includes a coaxial cable, an optical cable, an Ethernet (IEC 61883-6) cable, an HDMI cable, an MHL cable, or a display port cable.

19. A reception method comprising:
receiving, from a transmission side via a predetermined transmission path, a transmission signal including audio signals of a predetermined number of channels and tactile presentation signals of a predetermined number of channels and to which metadata designating a tactile presentation position targeted by each of the tactile presentation signals of the predetermined number of channels is added;

extracting and outputting the audio signal of the predetermined channel from the transmission signal, extracting the tactile presentation signal of the predetermined channel from the transmission signal, and outputting each of the tactile presentation signals of the predetermined channels as a tactile presentation signal of a target tactile presentation position on a basis of the metadata; and performing fade-out and fade-in processing on the tactile presentation signals of the predetermined number of channels or inserting a mute signal to the tactile presentation signals of the predetermined number of channels when the metadata is changed from a first state to a second state.

* * * * *